(12) United States Patent
Aoyama

(10) Patent No.: US 6,317,159 B1
(45) Date of Patent: Nov. 13, 2001

(54) IMAGE PROCESSOR FOR CONVERSION OF SCANNING LINES AND CONVERSION METHOD OF THE SAME

(75) Inventor: Koji Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/293,139

(22) Filed: Apr. 16, 1999

(30) Foreign Application Priority Data

Apr. 22, 1998 (JP) .................................................. 10-111761

(51) Int. Cl.[7] .............................. H04N 7/01; H04N 11/20
(52) U.S. Cl. ......................... 348/458; 348/441; 348/443; 348/448
(58) Field of Search .................................. 348/441, 443, 348/448, 458; 382/298, 299; H04N 7/01, 11/20

(56) References Cited

U.S. PATENT DOCUMENTS

| | | | |
|---|---|---|---|
| 5,504,532 | * | 4/1996 | Rhodes ................................. 348/458 |
| 5,907,364 | * | 5/1999 | Furuhata et al. ..................... 348/459 |
| 5,929,924 | * | 7/1999 | Chen ..................................... 348/552 |
| 6,020,927 | * | 2/2000 | Tanaka et al. ........................ 348/458 |
| 6,177,922 | * | 1/2001 | Schiefer et al. ...................... 345/132 |
| 6,188,803 | * | 2/2001 | Iwase et al. .......................... 382/300 |

FOREIGN PATENT DOCUMENTS 09-65293 * 3/1997 (JP) ................................ H04N/7/01

* cited by examiner

*Primary Examiner*—Reinhard J. Eisenzopf
*Assistant Examiner*—Brian P. Yenke
(74) *Attorney, Agent, or Firm*—Sonnenschein, Nath & Rosenthal

(57) ABSTRACT

A scanning line number converting apparatus using a linear array type multi-parallel processor constructed by an input image data storing unit, a plurality of element processors which has a data memory section and an ALU array section and are provided in parallel and operate in accordance with the same command for a plurality of data, and an output image data storing unit, wherein one of the element processors is used as an FIFO and image data is transferred to the other element processors, and an interpolation arithmetic operation for a scanning line number conversion is executed by the element processor on the transfer destination side, so that the scanning line number conversion can be performed without using any image memory and memory controller.

12 Claims, 21 Drawing Sheets

$$Cub(x) = \begin{cases} |x|^3 - 2|x|^2 + 1 & |x| <= 1 \\ -|x|^3 + 5|x|^2 - 8|x| + 4 & 1 < |x| <= 2 \\ 0 & 2 < |x| \end{cases}$$

| | PHASE | P3 | P1 | P2 | P3 | P1 | ..... |
|---|---|---|---|---|---|---|---|
| CUBIC COEFFICIENT | C1 | −0.070 | 0.000 | −0.145 | −0.070 | 0.000 | ..... |
| | C2 | 0.406 | 1.000 | 0.809 | 0.406 | 1.000 | ..... |
| | C3 | 0.809 | 0.000 | 0.406 | 0.809 | 0.000 | ..... |
| | C4 | 0.145 | 0.000 | −0.070 | 0.145 | 0.000 | ..... |
| INPUTS OF MULTIPLIER | D1 | ..... | $R_{i-1}$ | $R_{i-1}$ | $R_i$ | $R_{i+1}$ | ..... |
| | D2 | ..... | $R_i$ | $R_i$ | $R_{i+1}$ | $R_{i+2}$ | ..... |
| | D3 | ..... | $R_{i+1}$ | $R_{i+1}$ | $R_{i+2}$ | $R_{i+3}$ | ..... |
| | D4 | ..... | $R_{i+2}$ | $R_{i+2}$ | $R_{i+3}$ | $R_{i+4}$ | ..... |

| | PHASE | | $P_1$ | $P_2$ | $P_1$ | ..... |
|---|---|---|---|---|---|---|
| CUBIC COEFFICIENT | $C_1$ | | 0.000 | −0.125 | 0.000 | ..... |
| | $C_2$ | | 1.000 | 0.625 | 1.000 | ..... |
| | $C_3$ | | 0.000 | 0.625 | 0.000 | ..... |
| | $C_4$ | | 0.000 | −0.125 | 0.000 | ..... |
| INPUTS OF MULTIPLIER | $D_1$ | ..... | $R_{i-1}$ | $R_i$ | $R_{i+1}$ | $R_{i+2}$ | ..... |
| | $D_2$ | ..... | $R_i$ | $R_{i+1}$ | $R_{i+2}$ | $R_{i+3}$ | ..... |
| | $D_3$ | ..... | $R_{i+1}$ | $R_{i+2}$ | $R_{i+3}$ | $R_{i+4}$ | ..... |
| | $D_4$ | ..... | $R_{i+2}$ | $R_{i+3}$ | $R_{i+4}$ | $R_{i+5}$ | ..... |

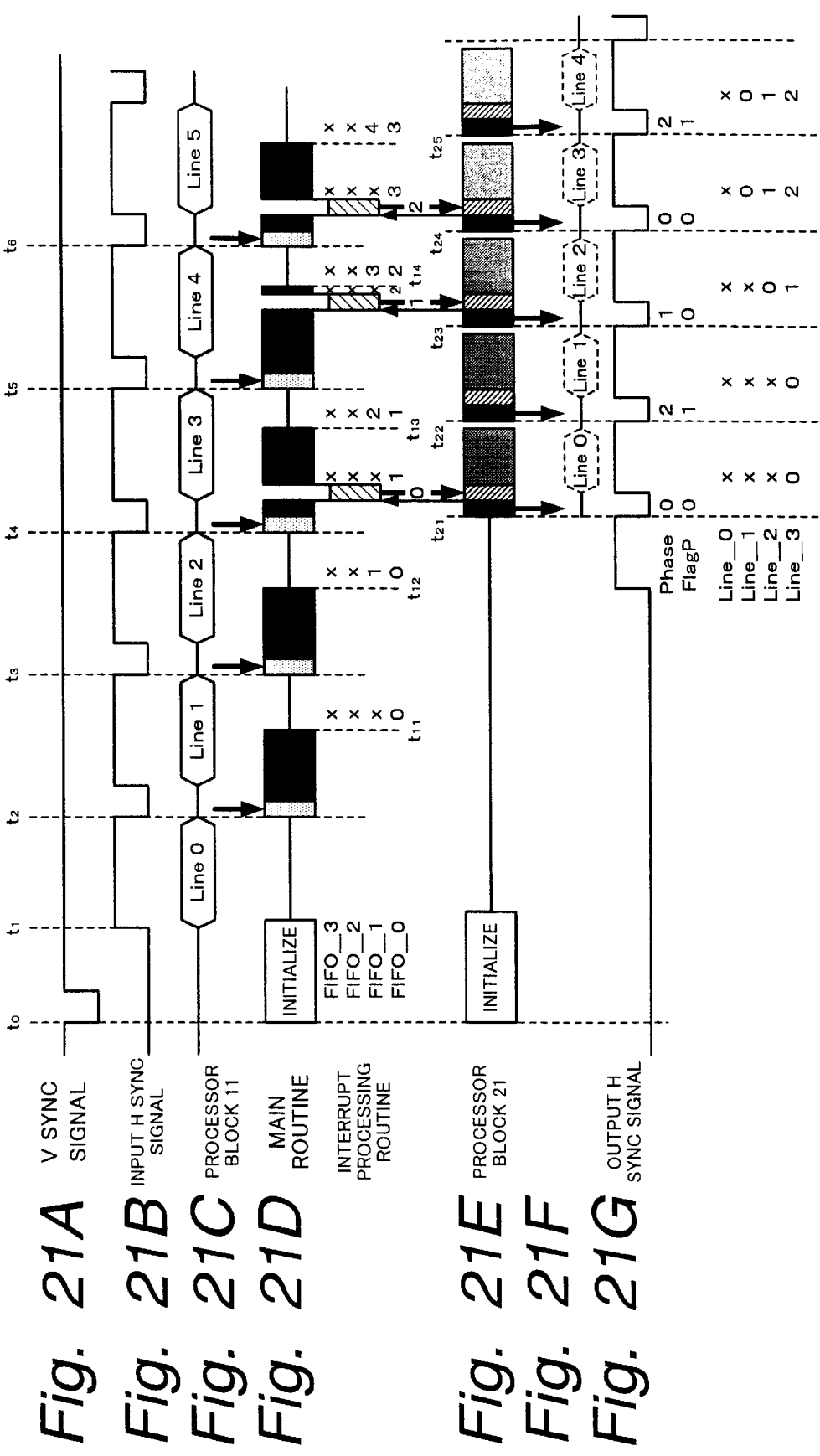

Fig. 22

FETCHING OF INPUT DATA TO INPUT SAM UNIT

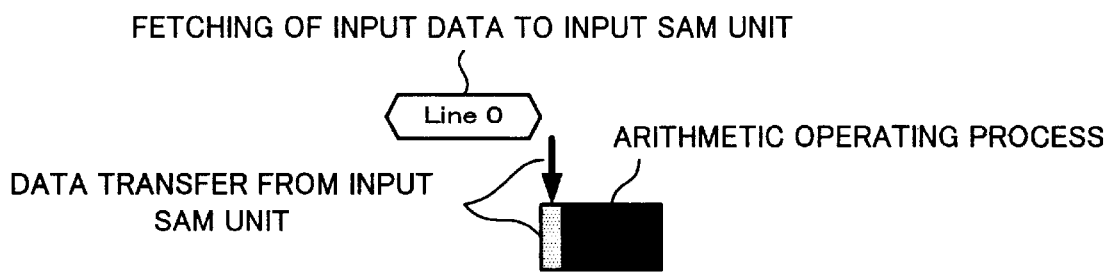

ARITHMETIC OPERATING PROCESS

DATA TRANSFER FROM INPUT SAM UNIT

Fig. 23

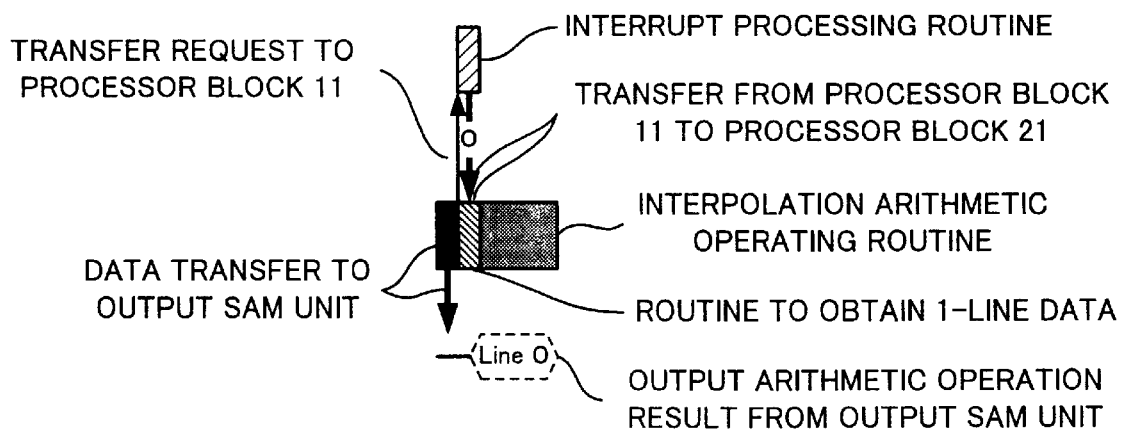

TRANSFER REQUEST TO PROCESSOR BLOCK 11

INTERRUPT PROCESSING ROUTINE

TRANSFER FROM PROCESSOR BLOCK 11 TO PROCESSOR BLOCK 21

INTERPOLATION ARITHMETIC OPERATING ROUTINE

DATA TRANSFER TO OUTPUT SAM UNIT

ROUTINE TO OBTAIN 1-LINE DATA

OUTPUT ARITHMETIC OPERATION RESULT FROM OUTPUT SAM UNIT

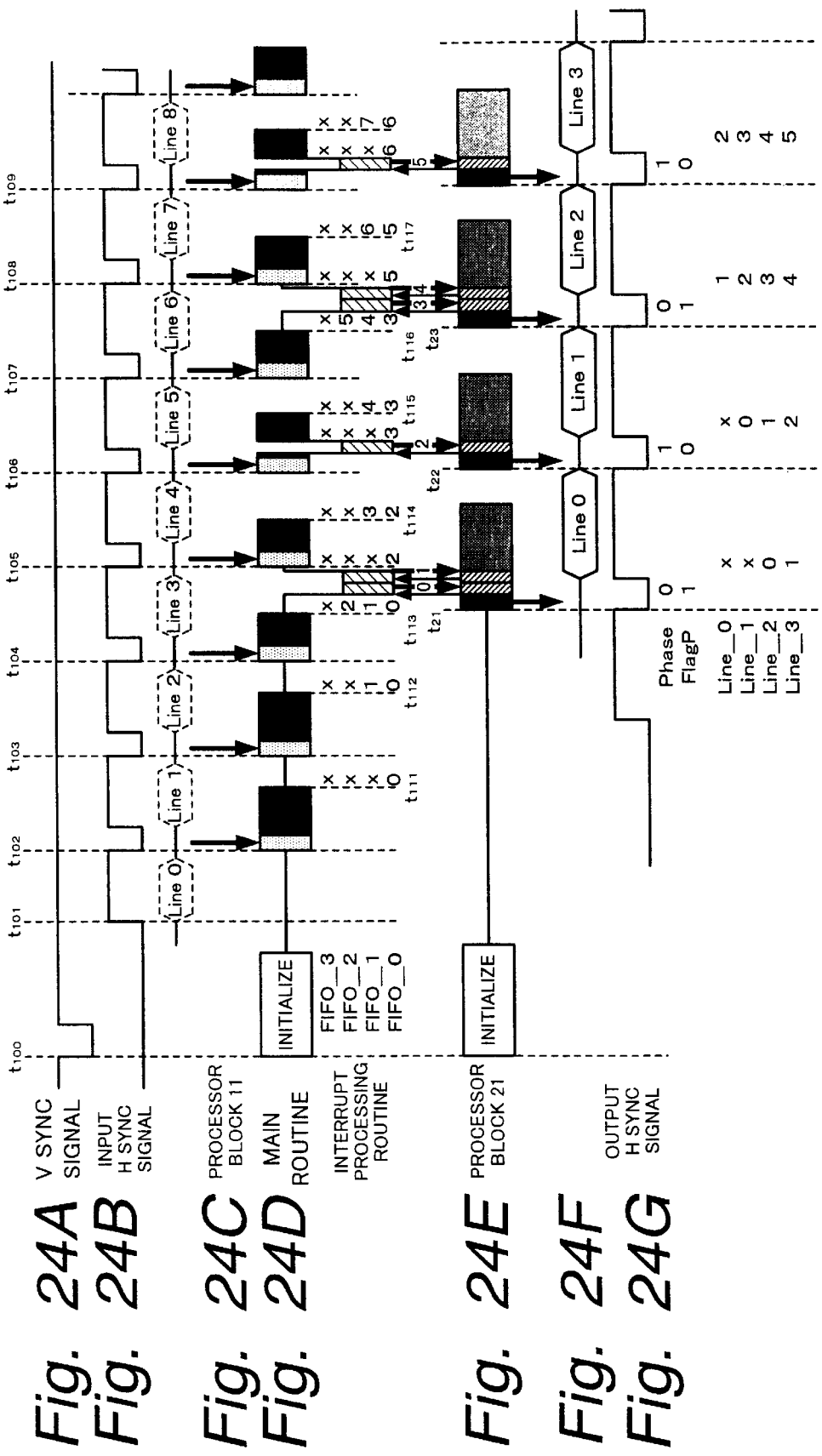

IMAGE PROCESSOR FOR CONVERSION OF SCANNING LINES AND CONVERSION METHOD OF THE SAME

BACKGROUND OF THE INVENTION

1. Field of the Invention

The invention relates to a scanning line number converting circuit for converting video signals of various formats of the different numbers of scanning lines into video signals of the predetermined number of scanning lines.

2. Description of the Related Art

As a standard television broadcasting signal, an NTSC (National Television System Committee) system and a PAL (Phase Alternation by Line) system have been known. Although the number of scanning lines of one frame is equal to 525 in the NTSC system, the number of scanning lines of one frame is equal to 625 in the PAL system. The numbers of scanning lines, therefore, in the NTSC system and the PAL system differ.

The development of television broadcastings of not only the standard system such as NTSC system or PAL system but also the HDTV (High Definition Television) system has been being developed in recent years. The number of scanning lines of one frame in the HDTV system is equal to 1125.

In computer images, further, a video signal of a format different from that of the television broadcasting is used, the number of pixels of VGA (Video Graphics Array) is equal to (640×480) dots, and the number of pixels of SVGA (Super VGA) is equal to (800×600)dots.

As mentioned above, in recent years, not only the video signal of the standard system such as NTSC system or PAL system but also video signals of various formats of the different numbers of scanning lines such as video signal of the HDTV system, video signal for computers, and the like are used. A display which can cope with the video signals of those various formats is demanded.

Hitherto, as a display, a CRT (Cathode Ray Tube) display has widely been used. In case of the CRT display, the number of scanning lines changes by changing a deflecting speed of an electron beam. It is, therefore, possible to relatively easily realize a display which can cope with the video signals of various formats. However, in the CRT display, an electric power consumption is large and it is difficult to miniaturize.

On the other hand, recently, in place of the CRT display, the development of an LCD (Liquid Crystal Display) display, a plasma display, and the like has been being progressed. In the LCD display and plasma display, since the size is small and an electric power consumption is small, it is presumed that they will be further spread in future.

In the LCD display and plasma display, however, the positions and the number of pixels are fixed. Therefore, to allow the LCD display or plasma display to cope with video signals of various formats, it is necessary to convert the number of scanning lines.

As a method of converting the number of scanning lines, there have been proposed a nearest neighborhood interpolating method of extracting data of a line existing at the position nearest to the position of a line after completion of the conversion of the number of scanning lines from inputted data of one scanning line, a bilinear interpolating method of extracting data of two lines existing at the positions nearest to the position of the line after completion of the conversion of the number of scanning lines from inputted data of one scanning line and linearly interpolating from the data of two lines, a filter switching interpolating method of converting the number of scanning lines by using an FIR filter in accordance with a conversion ratio, and the like.

Although the nearest neighborhood interpolating method can be realized by an extremely simple logic arithmetic operation on a hardware construction, there are problems such that a picture quality after the conversion fairly deteriorates, thin lines are extinguished and a small figure is distorted at the time of reduction, and a notched portion appears in a peripheral portion at the time of enlargement.

According to the bilinear interpolating method, although the deterioration of the picture quality is less than that of the nearest neighborhood interpolating method, when an image is reduced into (2:1) or less, a phenomenon called a line dropout occurs and the picture quality remarkably deteriorates. According to this method, since a gentle low pass filter is performed, particularly, a picture quality of a vertical edge portion (lateral fringe) becomes a picture quality of a slightly blur image.

On the other hand, in the filter switching interpolating method, the conversion of the number of scanning lines is performed by using an FIR filter in accordance with a conversion ratio. According to the filter switching interpolating method, although a construction becomes complicated, the conversion of the number of scanning lines can be performed at a high picture quality as compared with the nearest neighborhood interpolating method and the bilinear interpolating method.

The filter switching interpolating method will now be described hereinbelow. The conversion of the number of scanning lines of a non-interlace image will be first described. In the non-interlace image, a process of a frame period is performed and even after the conversion of the number of scanning lines, so long as the non-interlace, there is no need to separate the processes for the first field and the second field. Therefore, the processes are relatively more simple than those of an interlace image. To show an outline of an idea, explanation will be first made with respect to a non-interlace signal as an example.

For example, a principle of the conversion of the number of lines for the (2:3) enlargement (hereinafter, also referred to as a (2:3) enlargement line number conversion) such as to form three output lines for two input lines will now be described.

FIG. 1 shows a diagram for explaining the principle of the line number conversion for the (2:3) enlargement. In FIG. 1, values of each input line are set to Ri−1, Ri, Ri+1, Ri+2, Ri+3, . . . and values of each output line are set to Qi, Qi+1, Qi+2, Qi+3, . . . , respectively. In the diagram, P1, P2, P3, P1, . . . indicate deviations (line phase information) of the phases of the input lines and output lines.

In the (2:3) enlargement line number conversion, as shown in FIG. 1, three output lines are formed for two input lines and between the input line and the output line, there is a relation such that the values of the output line are calculated from the input line near them. Various interpolating methods exist in dependence on which range is used as a neighborhood range to form the output lines, which coefficient values are used as values of coefficients when the output lines are calculated by the interpolation from the input lines, or the like. However, an example of a cubic interpolation for interpolating from ranges of four points (corresponding to four lines) as neighborhood ranges will now be described hereinbelow.

A cubic interpolation function Cub(x) which is used in the cubic interpolation is shown in FIG. 2 and its functional equations are shown in equations (1). It is assumed that an axis of abscissa of the cubic interpolation function shown in the equations (1) is normalized by a sampling interval when an original image is sampled to a digital signal.

$$Cub(x)=|x|^3-2|x|^2+1 \text{ (when } |x|\leq 1)$$

$$Cub(x)=-|x|^3+5|x|^2-8|x|+4 \text{ (when } 1<|x|\leq 2)$$

$$Cub(x)=0 \text{ (when } 2<|x|) \quad (1)$$

In case of the enlargement line number conversion, an interpolation value of each output line is expressed by a convolution arithmetic operation of the values of the four input lines and the cubic function and the interpolation values of the output lines can be expressed as shown by the following equations (2).

$$Qi=Cub(x11)*Ri-1+Cub(x12)*Ri+Cub(x13)*Ri+1+Cub(x14)*Ri+2$$

$$Qi+1=Cub(x21)*Ri-1+Cub(x22)*Ri+Cub(x23)*Ri+1+Cub(x24)*Ri+2$$

$$Qi+2=Cub(x31)*Ri+Cub(x32)*Ri+1+Cub(x33)*Ri+2+Cub(x34)*Ri+3 \quad (2)$$

Each coefficient Cub(x) of the equations (2) is a value that is calculated from the cubic interpolation function and is calculated from the phase showing a degree of the deviation of the output line to be obtained from the input line. For example, in case of the (2:3) enlargement line number conversion shown in FIG. 1, since the phase of the output line Qi coincides with the phase of the input line (for example, input line Ri) near it, the phase information P1 is equal to zero. Similarly, since the phase of the output line Qi+1 is deviated from the phase of the input line (input line Ri) near it by 2/3, the phase information P2 is equal to 2/3. Since the phase of the output line Qi+2 is deviated from the phase of the input line (for example, input line Ri+1) near it by 1/3, the phase information P3 is equal to 1/3. Therefore, the equations (2) can be rewritten as shown in the following equations (3).

$$Qi=Cub(-1)*Ri-1+Cub(0)*Ri+Cub(1)*Ri+1+Cub(2)*Ri+2$$

$$Qi+1=Cub(-5/3)*Ri-1+Cub(-2/3)*Ri+Cub(1/3)*Ri+1+Cub(4/3)*Ri+2$$

$$Qi+2=Cub(-4/3)*Ri+Cub(-1/3)*Ri+1+Cub(2/3)*Ri+2+Cub(5/3)*Ri+3 \quad (3)$$

Since the coefficient Cub(x) and the values Ri−1, Ri, Ri+1, and Ri+2 of the input lines are well-known values, the interpolation data of each output line can be calculated from the equations (3). For example, when considering only the output line Qi, since Cub(−1)=0, Cub(0)=1, Cub(1)=0, and Cub(2)=0 from the equations (1), $$Qi=0*Ri-1+1*Ri+0*Ri+1+0*Ri+2=Ri \quad (4)$$

Thus, it becomes the value of the input line itself.

Although the case of the (2:3) enlargement line number conversion has been described as an example above, the same shall also similarly apply to an arbitrary enlargement ratio. If the phase of the output line is merely known, each coefficient of the cubic function is obtained from the equations (1) by the phase and it is sufficient to perform a convolution arithmetic operation with the four input lines near the interpolation line.

A principle of, for instance, the conversion of the number of lines for a (3:2) reduction (hereinafter, also referred to as a (3:2) reduction line number conversion) such as to form two output lines for three input lines will now be explained.

FIG. 3 shows a diagram for explaining the principle of the (3:2) reduction line number conversion. Even in FIG. 3 as well, in a manner similar to FIG. 1, values of each input line are set to Ri−1, Ri, Ri+1, Ri+2, Ri+3, ... and values of each output line are set to Qi, Qi+1, Qi+2, ..., respectively. In the diagram, P1, P2, P1, ... indicate deviations (line phase information) of the phases of the input lines and output lines.

In the (3:2) reduction line number conversion, in a manner similar to the enlargement line number conversion, between the input line and the output line, there is a relation such that the values of the output line are calculated from the input line near them. Even in the (3:2) reduction line number conversion, a cubic interpolation for calculating the output line (interpolation line) by the interpolation from the four input lines near it in a manner similar to the above will now be described.

That is, in case of the reduction line number conversion of FIG. 3, interpolation equations of the interpolation values (for example, Qi, Qi+1) of each output line are as shown in the following equations (5).

$$Qi=Cub(x11)*Ri-1+Cub(x12)*Ri+Cub(x13)*Ri+1+Cub(x14)*Ri+2$$

$$Qi+1=Cub(x21)*Ri+Cub(x22)*Ri+1+Cub(x23)*Ri+2+Cub(x24)*Ri+3 \quad (5)$$

Even in the reduction line number conversion, each coefficient Cub(x) of the equations (5) is a value that is calculated from the equations (1) as cubic functional equations and is calculated from the phase showing a degree of the deviation of the output line to be obtained from the input line. In case of the (3:2) reduction line number conversion shown in the diagram, since the phase of the output line Qi coincides with the phase of the input line (input line Ri) near it, the phase information P1 is equal to zero. Similarly, since the phase of the output line Qi+1 is deviated from the phase of the input line (input line Ri+1 of Ri) near it by 1/2, the phase information P2 is equal to 1/2. Therefore, the equations (5) can be rewritten as shown in the following equations (6).

$$Qi=Cub(-1)*Ri-1+Cub(0)*Ri+Cub(1)*Ri+1+Cub(2)*Ri+2$$

$$Qi+1=Cub(-3/2)*Ri+Cub(-1/2)*Ri+1+Cub(1/2)*Ri+2+Cub(3/2)*Ri+3 \quad (6)$$

Since the coefficient Cub(x) and the values Ri−1, Ri, Ri+1, and Ri+2 of the input lines are well-known values, the interpolation data of each output line can be calculated from the equations (6). For example, when considering only the output line Qi, since Cub(−1)=0, Cub(0)=1, Cub(1)=0, and Cub(2)=0 from the equations (1), $$Qi=0*Ri-1+1*Ri+0*Ri+1+0*Ri+2=Ri \quad (7)$$

Thus, it becomes the value of the input line itself.

Although the case of the (3:2) reduction line number conversion has been described as an example above, the same shall also similarly apply to an arbitrary reduction ratio. If the phase of the output line is merely known, each coefficient of the cubic function is obtained from the equations (1) by the phase and it is sufficient to perform a convolution arithmetic operation with the four input lines near the interpolation line.

Hitherto, the line number conversion as mentioned above has been realized by, for example, a hard wired construction as shown in FIG. 4. In the line number conversion, the process to distinguish a luminance signal and a chroma signal in accordance with a format of the chroma as in the pixel number conversion is unnecessary and it is sufficient to use the same circuit for the luminance signal and for the chroma signal.

In the construction shown in FIG. 4, each of line memories (or registers) 101 to 104 which are serially connected delays supplied data by the time corresponding to one scanning line. Therefore, the line memories of four stages are constructed by them. In the line memories 101 to 104, when an input shift control signal IE is at the "H" level, the input data of one line supplied from an input terminal 100 is delayed and image data which was shifted by the time of one scanning line is outputted. In the registers 101 to 104, on the other hand, when the input shift control signal IE is at the "L" level, the input data is not shifted but the previous line value is held. The image data obtained by line-shifting by the registers 101 to 104 is sent to corresponding multipliers 111 to 114, respectively.

A cubic coefficient generator 105 generates cubic coefficients C1 to C4 every line and supplies the cubic coefficients C1 to C4 as multiplication coefficients to the corresponding multipliers 111 to 114, respectively. In the multipliers 111 to 114, therefore, the cubic coefficients C1 to C4 generated by the cubic coefficient generator 105 and the input line data shifted by the shift registers 101 to 104 are multiplied, respectively. However, the values of the cubic coefficients generated by the cubic coefficient generator 105 are switched every line and are set to the same value in one line. Multiplication results of the multipliers 111 to 114 are added by an adder 107 and an addition result is inputted to an FIFO (first-in first-out) field memory 108.

A field memory 110 is provided to desultorily output the line data necessary in case of the enlargement line number converting process. In case of the enlargement line number conversion, a mode to output the line data or a mode to hold the value of the previous line is switched on the basis of an input skip line control signal SCI which is supplied from a controller 106 and the line data or the value of the previous line is outputted to the line memory 101. In case of the reduction line number converting process, the field memory 110 is used as a mere FIFO memory and is a mere delay element.

A field memory 108 is provided to desultorily output the line data in case of the reduction line number converting process. In case of the reduction line number conversion, the line data is desultorily skipped on the basis of an output skip line control signal SCO which is supplied from the controller 106 and is outputted to an output terminal 109. The field memory 108 is used as a mere FIFO memory in case of the enlargement line number converting process and is a mere delay element.

The controller 106 generates the output skip line control signal SCO of the field memory 108 as an output port memory and the input shift control signal IE of the line memories 101 to 104 on the basis of the conversion ratio when the enlargement or reduction line number conversion is performed and, further, performs a timing control for the cubic coefficient generator 105.

FIG. 5 shows relations between a line layout at the time of the (2:3) enlargement line number converting process and the cubic coefficients C1, C2, C3, and C4 in the hardware construction of FIG. 4. FIG. 6 shows the cubic coefficients at each phase. In case of performing the (2:3) enlargement line number converting process, as shown in FIG. 5, the operations such that the input line data as much as three lines is shifted by the input shift control signal IE and the line data of one line before is not shifted are repeated. Input data D1, D2, D3, and D4 to the multipliers 111 to 114 in FIG. 4 become multiplier inputs D1, D2, D3, and D4 in FIG. 5. As shown in the following equation (8), a desired result is derived by performing a convolution arithmetic operation of those multiplier inputs and the cubic coefficients C1, C2, C3, and C4.

$$Q = C1*D1 + C2*D2 + C3*D3 + C4*D4 \qquad (8)$$

Although the example of the (2:3) enlargement line number conversion has been shown here for simplicity of explanation, in case of arbitrary enlargement ratios, since their principles are substantially the same as that mentioned above except that the timing control merely differs, their descriptions are omitted here.

FIG. 7 shows relations between a line layout at the time of the (3:2) reduction line number converting process and the cubic coefficients C1, C2, C3, and C4 in the hardware construction of FIG. 4. FIG. 8 shows the cubic coefficients at each phase. In the diagram, "Skip" denotes output lines to be skipped. In case of the reduction line number converting process, different from the case of the enlargement line number converting process, the input shift control signal IE is always set to the "L" level and the input line data is inputted as it is to the registers 101 to 104. Therefore, the input data D1 to D4 of the multipliers 111 to 114 become multiplier inputs D1 to D4 in the diagram. A desired result is derived by performing a convolution arithmetic operation of those multiplier inputs and the cubic coefficients C1, C2, C3, and C4 in accordance with the equation (8). In case of the (3:2) reduction line number conversion, since one input line is unnecessary for three lines to be outputted, the unnecessary line is skipped by controlling the writing operation to the field memory 108. A control signal for this purpose becomes the skip control signal SCO of the output line. That is, the output skip line control signal SCO is a signal to control the field FIFO memory 108 in a manner such that the lines are skipped when the signal SCO is at the "H" level and the lines are not skipped when it is at the "L" level.

Although the example of the (3:2) reduction line number converting process has been shown here for simplicity of explanation, in case of arbitrary reduction ratios, since their principles are substantially the same as that mentioned above except that the timing control merely differs, their descriptions are omitted here.

The above explanation relates to the example in case of what is called a non-interlace signal in which the input signal is subjected to the progressive scan. In what is called an interlace signal of the interlace scan, since the positions of the scanning lines are different in the first field and the second field for the picture plane, a setting method of the coefficients for interpolation differs for each of the second and first fields. Therefore, the actual control system has a more complicated construction and if the ratio differs, the coefficients also naturally differ, so that the input lines to be skipped and the output lines to be skipped also change in accordance with them. It is, therefore, necessary to independently calculate the interpolation coefficients and the skip line information in each field.

The conversion of the number of scanning lines (hereinafter, also referred to as a scanning line number conversion) of the interlace signal will now be described.

In the (2:3) enlargement scanning line number conversion, interpolation equations of the first field are substantially the same as the equations (3) in which the input is the non-interlace signal. In the interlace signal, like a first field input line signal 121 and a second field input line signal 123 and like a first field output line signal 122 and a second field output line signal 124 in FIG. 9, a relation in which the phases of the first and second fields are deviated by 1/2 has to be obtained, namely, the line of the second field has to be arranged at the center between the lines of the first field. Therefore, in the second field of the (2:3) enlargement scanning line number conversion, the phase deviations of the interpolation lines become P4, P5, and P6 in FIG. 9 and the phase information is equal to 5/7, 1/2, and 1/7, respectively. Thus, the interpolation values of the lines can be written as shown by the following equations (9) in a manner similar to the equations (3).

$$Qj=Cub(-12/7)*Rj-2+Cub(-5/7)*Rj-1+Cub(2/7)*Rj+Cub(9/7)*Rj+1$$

$$Qj+1=Cub(-3/2)*Rj-1+Cub(-1/2)*Rj+Cub(1/2)*Rj+1+Cub(3/2)*Rj+2$$

$$Qj+2=Cub(-8/7)*Rj+Cub(-1/7)*Rj+1+Cub(6/7)*Rj+2+Cub(13/7)*Rj+3 \qquad (9)$$

A suffix "j" denotes the second field and is distinguished from the suffix "i" of the first field. As will be also understood from the above equations, since there is no relation between the cubic coefficients and the lines necessary for interpolation for the first field and those for the second field, it is necessary to independently calculate them for an image signal of the interlace format.

Similarly, in the (3:2) reduction scanning line number conversion, interpolation equations of the first field are substantially the same as the equations (6) in which the input is the non-interlace signal. In this case as well, as shown in FIG. 10, like a first field input line signal 125 and a second field input line signal 127 and like a first field output line signal 126 and a second field output line signal 128, a relation in which the phases of the first and second fields are certainly deviated by 1/2 has to be obtained, namely, the line of the second field has to be arranged at the center between the lines of the first field. Therefore, in the second field of the (3:2) reduction scanning line number conversion, the phase deviations of the interpolation lines become P3 and P4 in FIG. 10 and the phase information is equal to 1/4 and 3/4, respectively. Thus, the interpolation values of the lines can be written as shown by the following equations (10) in a manner similar to the equations (6).

$$Qj=Cub(-5/4)*Rj-1+Cub(-1/4)*Rj+Cub(3/4)*Rj+1+Cub(7/4)*Rj+2$$

$$Qj+1=Cub(-7/4)*Rj+Cub(-3/4)*Rj+1+Cub(1/4)*Rj+2+Cub(5/4)*Rj+3 \qquad (10)$$

In this case as well, since the cubic coefficient set as for the second field is quite different from that in the first field, it is necessary to independently calculate them.

In the scanning line number converting process, it has been realized hitherto by what is called an ASIC (Application Specific Integrated Circuit) as mentioned above or the like.

In the scanning line number conversion as mentioned above, the interpolation coefficients and skip lines are totally different in dependence on whether the input signal is the non-interlace signal or the interlace signal and, further, in case of the interlace signal, they are different every field. To realize the interpolation arithmetic operation which is calculated from the coefficients of multi-taps like a cubic interpolation by ASIC, a conversion ratio of a small degree of freedom or a certain fixed conversion ratio has to be used or it cannot help limiting to a system such that up to a few kinds of conversion ratios are switched and used in consideration of a viewpoint of a circuit scale.

To cope with various ratios, further, to cope with various formats, or from a viewpoint of flexibility or the like such as change in bit precision after completion of the design, change in ratio converting algorithm, or the like, it is difficult to realize it by only hardware such as ASIC.

It is actually impossible to change the horizontal and vertical conversion in a real-time manner by the ASIC by using a filter switching interpolating method that is complicated on the circuit construction.

As mentioned above, in the conventional scanning line number converting circuit, the field memories and a memory controller are necessary. There are problems such that the field memories and the memory controller are relatively expensive and if the field memories and memory controller are provided, the circuit scale increases.

OBJECTS AND SUMMARY OF THE INVENTION

It is, therefore, an object of the invention to provide a scanning line number converting circuit which can perform a conversion of the number of scanning lines without using a field memory and a memory controller.

According to a first aspect of the invention, there is provided a scanning line number converting apparatus comprising:

input image data storing means for inputting 2-dimensional image data and arranging and storing the inputted 2-dimensional image data in correspondence to each pixel in a line direction;

a first processor comprising first temporary storing means for inputting the image data arranged in correspondence to the pixels in the line direction by the input image data storing means and for temporarily storing the image data of a plurality of lines and first arithmetic operation processing means for performing an arithmetic operating process to the image data stored in the first temporary storing means;

first control means for giving a control command to the first processor;

a second processor comprising second temporary storing means for inputting the image data from the first processor and for temporarily storing the image data of a plurality of lines and second arithmetic operation processing means for performing an arithmetic operating process to the image data stored in the second temporary storing means;

second control means for giving a control command to the second processor; and output line data storing means to which the image data from the second processor is transferred every line and which arranges and stores and sequentially outputs the image data in correspondence to the pixels in the line direction, wherein the first and second processors have a construction such that each column constructs element processors and a common command is given to each column by the first and second control means, the first temporary storing means of the first processor is allowed to function as a first-in first-out register to temporarily store the image data of a plurality of lines, the second processor generates a transfer request signal and sends the transfer request signal to the first processor, the first processor transfers the image data to the second processor in response to the transfer request signal, and a predetermined interpolation arithmetic operating process is performed in the second processor, thereby performing a scanning line number conversion.

According to a second aspect of the invention, there is provided a scanning line number converting method comprising:

a step of inputting 2-dimensional image data and arranging and storing the inputted 2-dimensional image data in correspondence to each pixel in a line direction;

a first image processing step of inputting the image data arranged in correspondence to each pixel in the line direction, temporarily storing the image data of a plurality of lines, and performing an arithmetic operating process to the stored image data;

a second image processing step of inputting the image data processed by the first image processing step, temporarily storing the image data of a plurality of lines, and performing an arithmetic operating process to the image data stored; and a step of transferring the image data processed by the second image processing step every line and arranging and storing the image data in correspondence to each pixel in the line direction, wherein the first and second image processing steps have a construction such that each column constructs element processors and a common command is given to each column, the first image processing step is allowed to function as a first-in first-out register to temporarily store the image data of a plurality of lines, and in the second image processing step, a transfer request is generated and the image data is transferred from the first-in first-out register to temporarily store the image data of a plurality of lines in response to the transfer request, and a predetermined interpolation arithmetic operating process is performed, thereby performing a scanning line number conversion.

According to the invention, a linear array type multi-parallel processor using an SIMD type architecture which comprises an input SAM unit, two processor blocks, and an output SAM unit and operates when a similar command is given to each element processor is used, one of the processor blocks is allowed to function as an FIFO, an interpolation arithmetic operation is performed in the other processor block, and a transfer request is sent to one processor block from the other processor block, so that a scanning line number conversion can be performed in a real-time manner without using any field memory.

In accordance with the phase information and the conversion ratio information based on the ratio of the number of scanning lines of the input image data and the number of scanning lines of the output image data, the transfer request is sent to one processor block from the other processor block. Therefore, by switching the phase information in accordance with the conversion ratio, the scanning line number conversion can be performed at an arbitrary ratio in a real-time manner.

In the first field and the second field, the different phase information are set as initial values into the image signal of the interlace system. The same phase information is set as an initial value into the image signal of the non-interlace system. Therefore, the invention can cope with both of the case of the interlace system and the case of the non-interlace system.

The above and other objects and features of the present invention will become apparent from the following detailed description and the appended claims with reference to the accompanying drawings.

BRIEF DESCRIPTION OF THE DRAWINGS

FIGS. 21A to 21G are timing charts for use in explanation of an enlargement converting process in the example of the scanning line number converting circuit to which the invention is applied;

FIG. 22 is a schematic diagram for use in explanation of an enlargement converting process in the example of the scanning line number converting circuit to which the invention is applied;

FIG. 23 is a schematic diagram for use in explanation of an enlargement converting process in the example of the scanning line number converting circuit to which the invention is applied; and FIGS. 24A to 24G are timing charts for use in explanation of a reduction converting process in the example of the scanning line number converting circuit to which the invention is applied.

DETAILED DESCRIPTION OF THE PREFERRED EMBODIMENTS

An embodiment of the invention will now be described hereinbelow with reference to the drawings. According to the invention, a scanning line number conversion can be performed by using a linear array type parallel processor without using any field memory. The linear array type parallel processor uses an SIMD (Single Instruction Multiple Data Stream) type architecture.

Various image processes can be performed by a signal processing processor only by setting of a program. In the field of the signal processes for image data, in many cases, a similar arithmetic operating process is performed to all of the pixels constructing one image. In the SIMD type architecture, element processors as many as only the necessary number are arranged and each element processor operates in accordance with the same command. Therefore, when data of each pixel of one line is given to each element processor, arithmetic operation results for the pixel data of one line are obtained in a lump by pipeline processes.

In this example, a linear array type parallel processor using processor blocks 11 and 21 of two stages is used. A data memory section 12 of the processor block 11 at the first stage has a function of an FIFO (First-in First-out) register to hold pixel data of a plurality of lines. At a necessary timing, the data is transferred from the processor block 11 at the first stage to the processor block 21 at the next stage. An interpolation arithmetic operation is performed and a scanning line number conversion is executed in the processor block 21 at the next stage. As mentioned above, by allowing the processor block 11 at the first stage to function as an FIFO, the scanning line number conversion can be performed without using any field memory.

Figure 1:
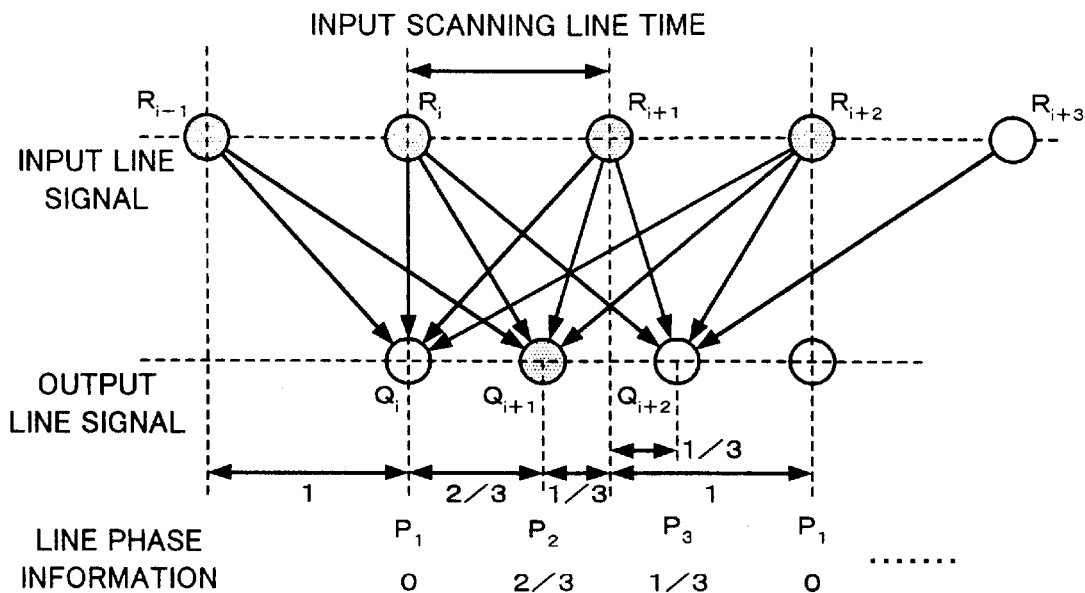
FIG. 1 is a schematic diagram for use in explanation of an enlargement converting process.
Figure 2:
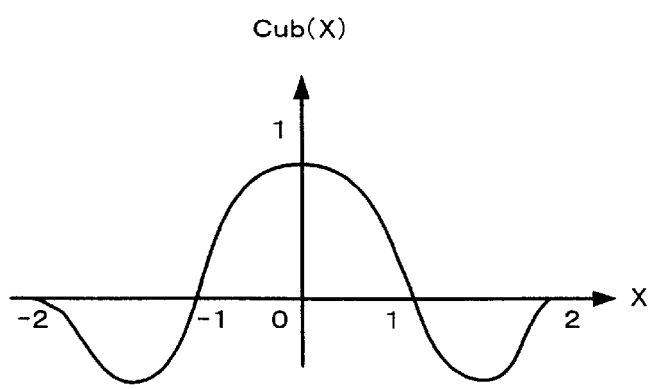
FIG. 2 is a graph for use in explanation of a cubic function.
Figure 3:
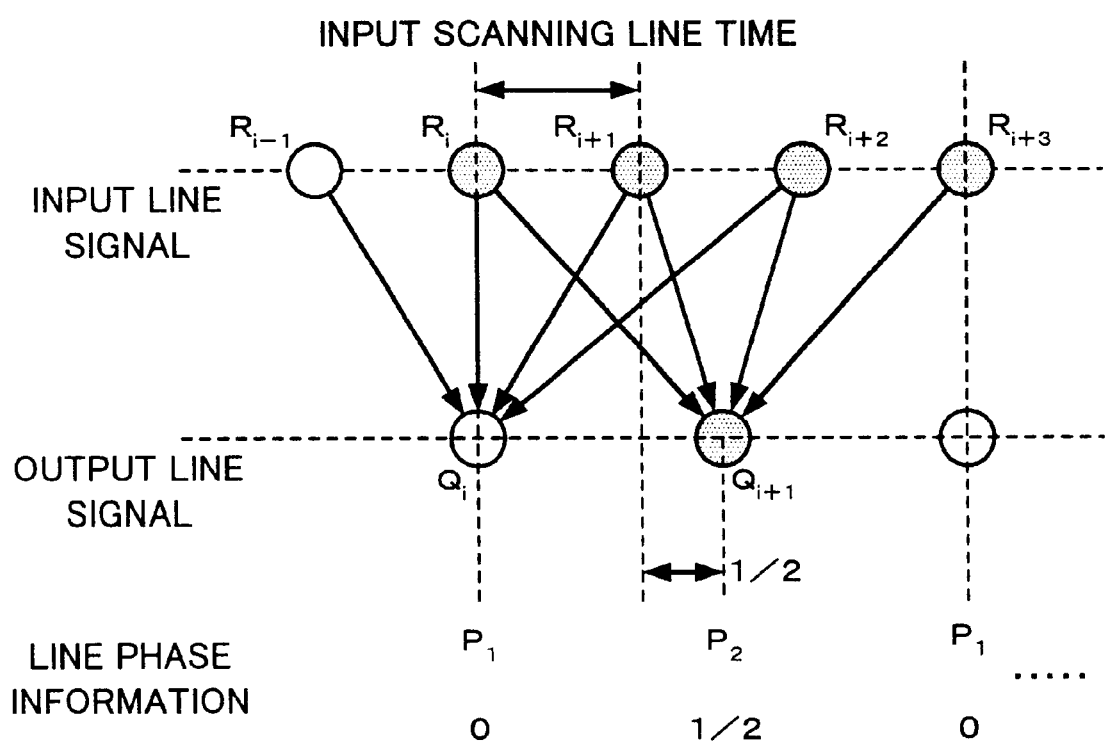
FIG. 3 is a schematic diagram for use in explanation of a reduction converting process.
Figure 4:
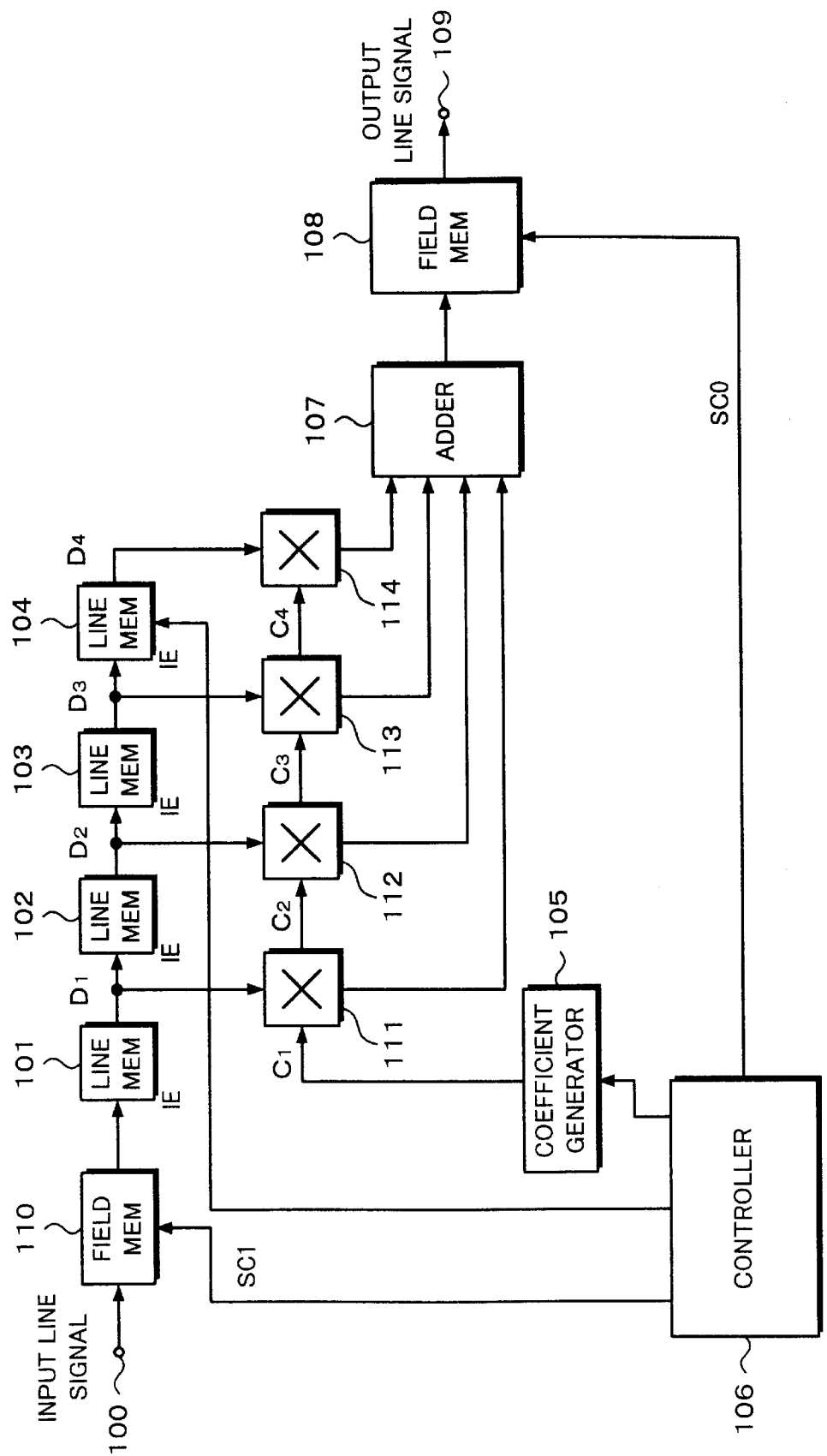
FIG. 4 is a block diagram of an example of a conventional scanning line number converting circuit.
Figures 5, 6:
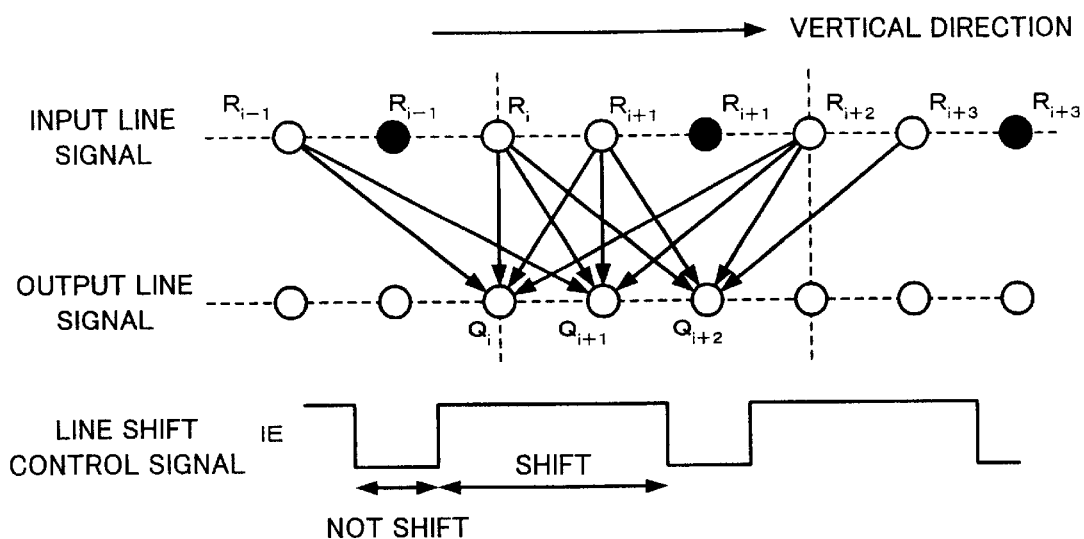
FIG. 5 is a schematic diagram for use in explanation of an enlargement converting process in the conventional scanning line number converting circuit.
FIG. 6 is a schematic diagram for use in explanation of the enlargement converting process in the conventional scanning line number converting circuit.
Figures 7, 8:
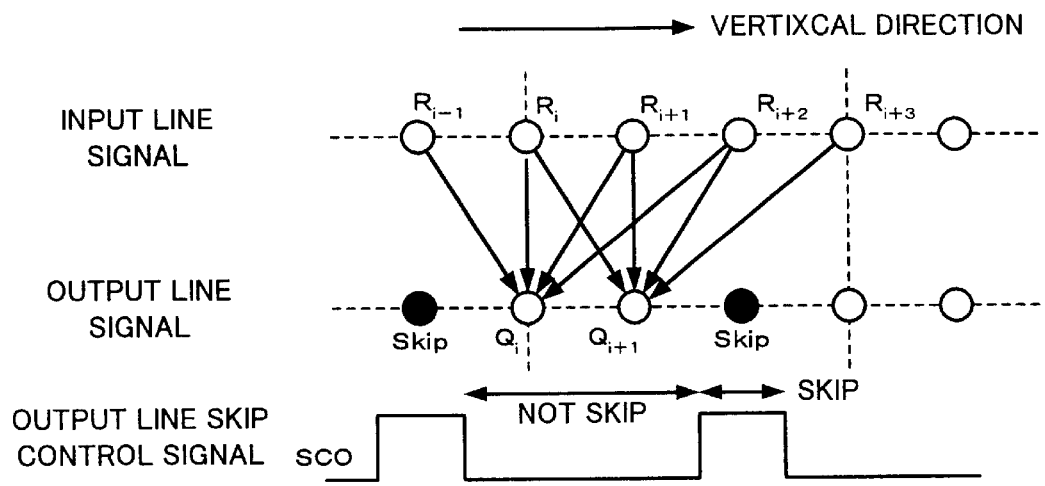
FIG. 7 is a schematic diagram for use in explanation of a reduction converting process in the conventional scanning line number converting circuit.
FIG. 8 is a schematic diagram for use in explanation of the reduction converting process in the conventional scanning line number converting circuit.
Figure 9:
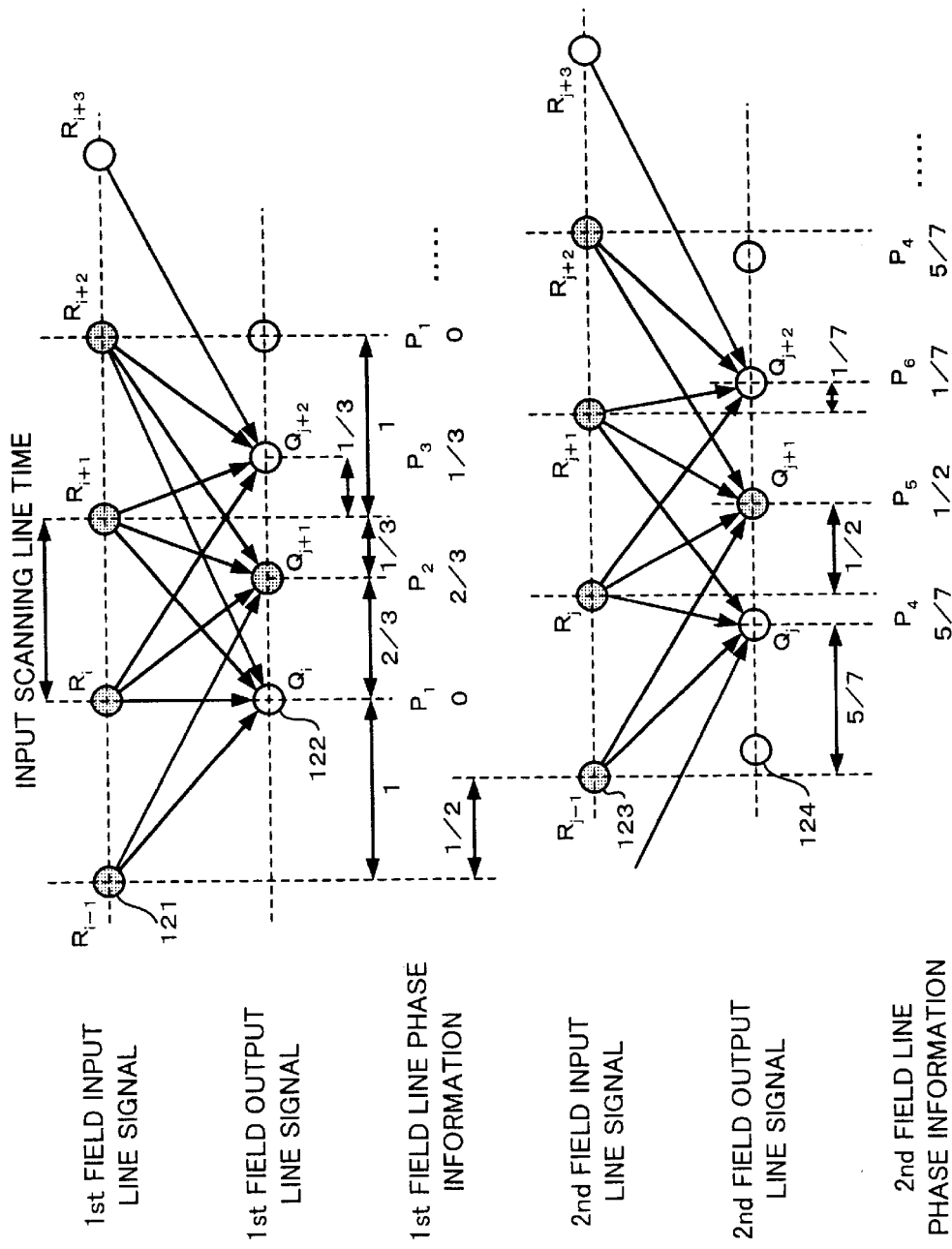
FIG. 9 is a schematic diagram for use in explanation of an enlargement converting process of an interlace signal.
Figure 10:
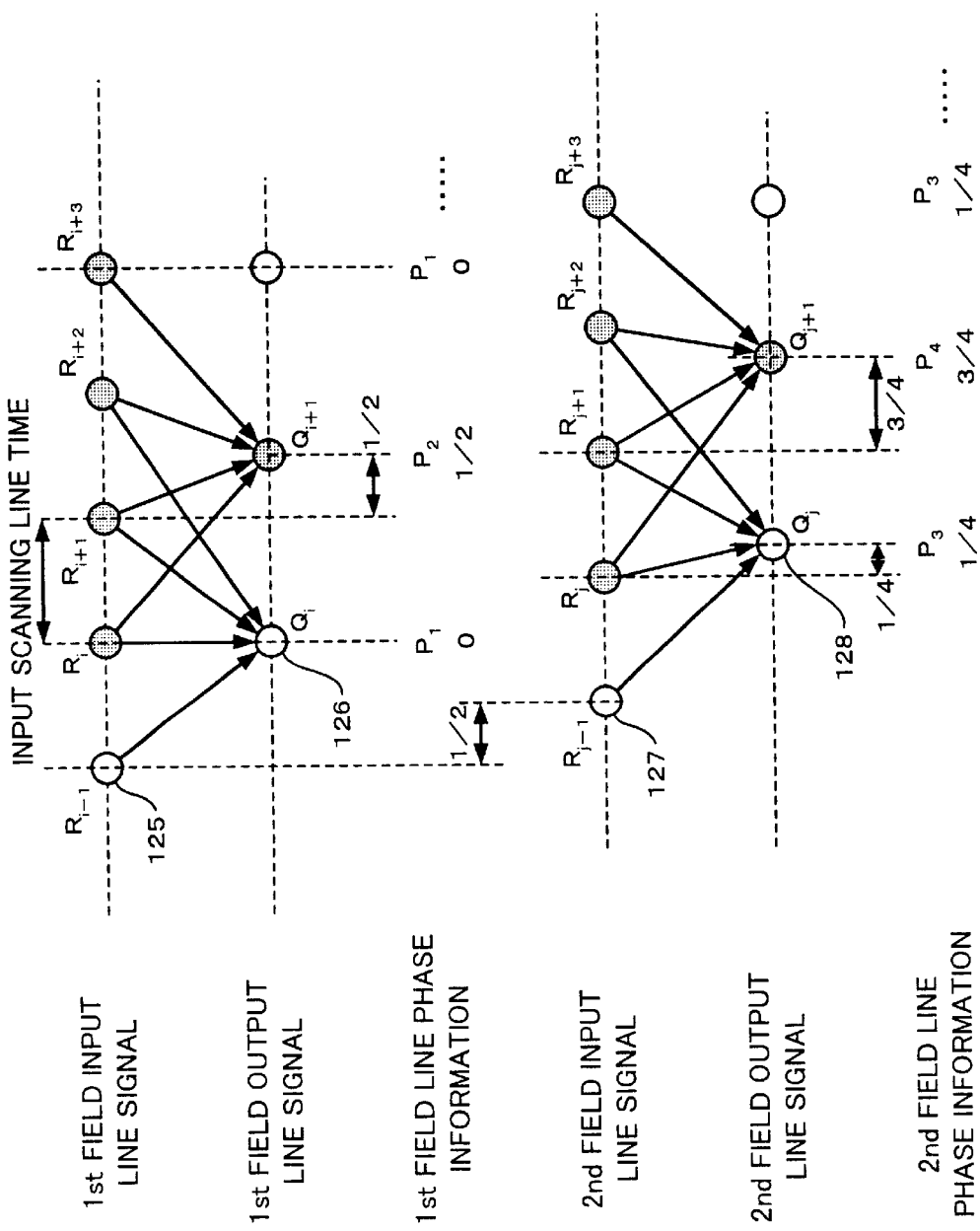
FIG. 10 is a schematic diagram for use in explanation of a reduction converting process of an interlace signal.
Figure 11:
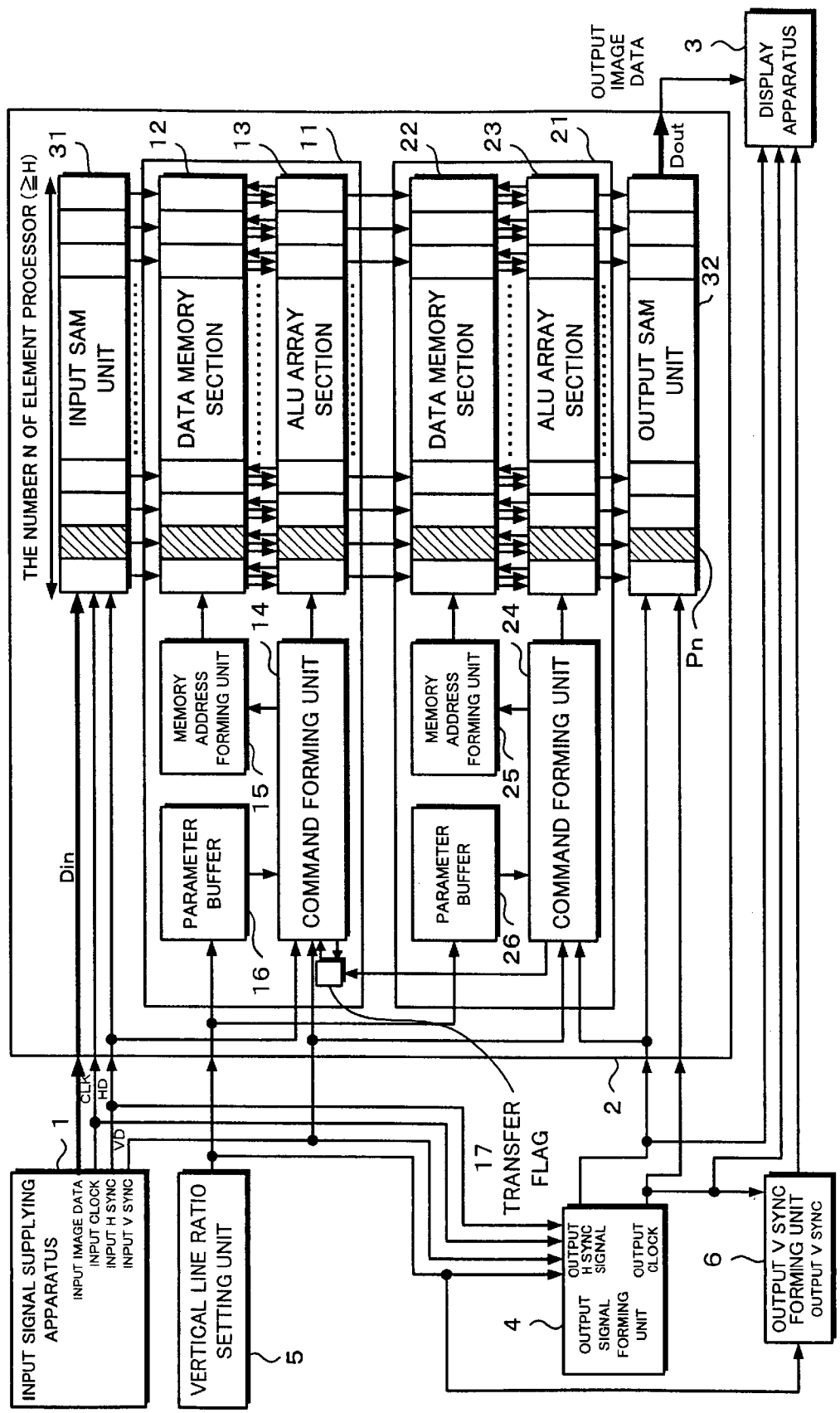
FIG. 11 is a block diagram showing a whole construction of an example of a scanning line number converting circuit to which the invention is applied.

FIG. 11 shows an outline of a scanning line number converting circuit to which the invention is applied. In FIG. 11, reference numeral 1 denotes an input signal supplying apparatus. The input signal supplying apparatus 1 outputs input image data before the scanning line number conversion is executed. Specifically, the supplying apparatus 1 is a video camera, a VCR (Video Cassette Recorder), a television tuner, or the like. There is also a case where a personal computer is used as an input signal supplying apparatus 1. The video signal that is outputted from such an input signal supplying apparatus 1 has a standard format as in the NTSC system or PAL system. There is also a case where the video signal has a format of the HDTV system as a high definition television system. In the case where the input signal supplying apparatus 1 outputs a picture plane of a personal computer, the video signal that is outputted from the input signal supplying apparatus 1 has a format of the VGA, SVGA, or XGA system.

Reference numeral 2 denotes a linear array type multi-parallel processor. The linear array type multi-parallel processor comprises: an input SAM (Serial Access Memory) unit 31; the processor blocks 11 and 21; an output SAM unit 32; and the like. This processor uses an SIMD type architecture in which element processors Pn as many as the necessary number (corresponding to the pixel data of one line) are arranged and which operates when a similar command is given to each of the element processors Pn.

In the linear array type multi-parallel processor, various video signal processes can be performed by only the setting of a program. As an example of applying the SIMD type processing apparatus to the image process, an apparatus disclosed in Kurokawa et al., "5.4GOPS Linear Array Architecture DSP for Video-Format Conversation", IEEE February 1996, ISSCC, FP 15.7.I" is known.

In the example, the linear array type multi-parallel processor 2 is constructed by the two processor blocks 11 and 21 and has the input SAM unit 31 and output SAM unit 32.

The data memory section 12, an ALU array section 13, a command forming unit 14, a memory address forming unit 15, a parameter holding buffer 16, and a data transfer flag setting unit 17 are provided for the processor block 11.

A data memory section 22, an ALU array section 23, a command forming unit 24, a memory address forming unit 25, and a parameter holding buffer 26 are provided for the processor block 21.

A data transfer flag setting unit can be also provided for the processor block 21.

As will be explained hereinlater, the data memory section 12 of the processor block 11 has a function of an FIFO register for the pixel data of a plurality of lines. A pixel number conversion in the horizontal direction, a filter arithmetic operation for the pixels in the horizontal direction, and the like are executed in the processor block 11. Data is transferred from the processor block 11 to the processor block 21 at a necessary timing and an interpolation arithmetic operation to perform the scanning line number conversion is executed in the processor block 21. As mentioned above, the scanning line number conversion is performed.

Reference numeral 3 denotes an output signal display apparatus for displaying the output image data. Specifically speaking, the output signal display apparatus 3 is an LCD display apparatus, a plasma display apparatus, or the like. There are various formats of the video signal which is outputted from the input signal supplying apparatus 1. There is a case where the number of scanning lines of the video signal that is outputted from the input signal supplying apparatus 1 and the number of scanning lines which can be coped by the output signal display apparatus 3 are different. In this case, the scanning line number conversion is performed by the linear array pixel multi-parallel processor 2. Thus, even when the number of scanning lines of the video signal that is outputted from the input signal supplying apparatus 1 and the number of scanning lines which can be coped by the output signal displaying apparatus 3 differ, the image based on the video signal from the input signal supplying apparatus 1 can be displayed by the output signal display apparatus 3.

As an output signal display apparatus 3, a CRT display apparatus can be also used besides the display of fixed pixels such as LCD display apparatus or plasma display.

A digital video signal and a horizontal sync signal and a vertical sync signal and a clock of the video signal are generated from the input signal supplying apparatus 1. The digital video signal, the horizontal sync signal of the video signal, and its clock are supplied to the input SAM unit 31 of the linear array type multi-parallel processor 2. The horizontal sync signal, vertical sync signal, and clock from the input signal supplying apparatus 1 are sent to an output signal forming unit 4. The vertical sync signal is supplied to an output vertical sync signal forming unit 6.

Reference numeral 5 denotes a vertical scanning line conversion ratio setting unit. A conversion ratio (M:N) of the numbers of scanning lines of an input image and an output image is set into the vertical scanning line conversion ratio setting unit 5. The conversion ratio (M:N) set in the vertical scanning line conversion ratio setting unit 5 is supplied to the parameter holding buffers 16 and 26 of the linear array type multi-parallel processor 2 and is also sent to the output signal forming unit 4.

The output signal forming unit 4 generates an output video signal and a horizontal sync signal and a clock of the output video signal from the horizontal sync signal, vertical sync signal, and clock of the input video signal inputted from the input signal supplying apparatus 1. The output clock and the output horizontal sync signal are formed so as to satisfy the following relational equations in case of the conversion ratio M:N (enlargement when M>N).

$$Tck\text{-out} = (N \times Tck\text{-in})/M$$

$$Th\text{-out} = (N \times Th\text{-in})/M$$

The output vertical sync signal forming unit 6 forms a vertical sync signal on the basis of the vertical sync signal from the input signal supplying apparatus 1. The output vertical sync signal is formed so as to satisfy the following relational equation in case of the conversion ratio M:N (enlargement when M>N).

$$Tv\text{-out} = (N \times Tv\text{-in})/M$$

where,

M:N: Scanning line number conversion ratio

Tck-in: Period of the input clock

Th-in: Period of the input horizontal sync signal

Tv-in: Period of the input vertical sync signal

Tck-out: Period of the output clock

Th-out: Period of the output horizontal sync signal

Tv-out: Period of the output vertical sync signal

The video signal in which the number of scanning lines has been converted by the linear array type multi-parallel processor 2 is supplied to the output signal display apparatus 3. A horizonal sync signal and a clock of the output video signal are formed by the output signal forming unit 4. The horizontal sync signal and clock are supplied to the output signal display apparatus 3. A vertical sync signal of the output video signal is formed by the vertical sync signal forming unit 6. The vertical sync signal is supplied to the output signal display apparatus 3.

Thus, an image based on the video signal from the input signal supplying apparatus 1 is displayed by the output signal display apparatus 3.

As mentioned above, in the scanning line number converting circuit to which the invention is applied, by using the linear array type multi-parallel processor, the scanning line number conversion is executed without using any field memory. The scanning line number converting process in such a linear array type multi-parallel processor 2 will now be described in detail.

The digital video signal from the input signal supplying apparatus 1 is supplied to the input SAM unit 31. The input clock and the input horizontal sync signal from the input signal supplying apparatus 1 are supplied to the input SAM unit 31. The serial digital video signal of one line from the input signal supplying apparatus 1 is developed to the image data of one line by the input SAM unit 31.

A similar arithmetic operating process is performed to each pixel and a process for each pixel is executed by the element processors Pn. Therefore, now assuming that the video signal is developed to the image data of one line and the process is executed in the input SAM unit 31, the element processors Pn as many as only the number of pixels of one line are arranged.

When a period of time during which the data from the input SAM unit 31 can be transferred, for example, a horizontal blanking period comes, each image data of one line is sent from the input SAM unit 31 to the data memory section 12 of the processor block 11.

Figure 12:
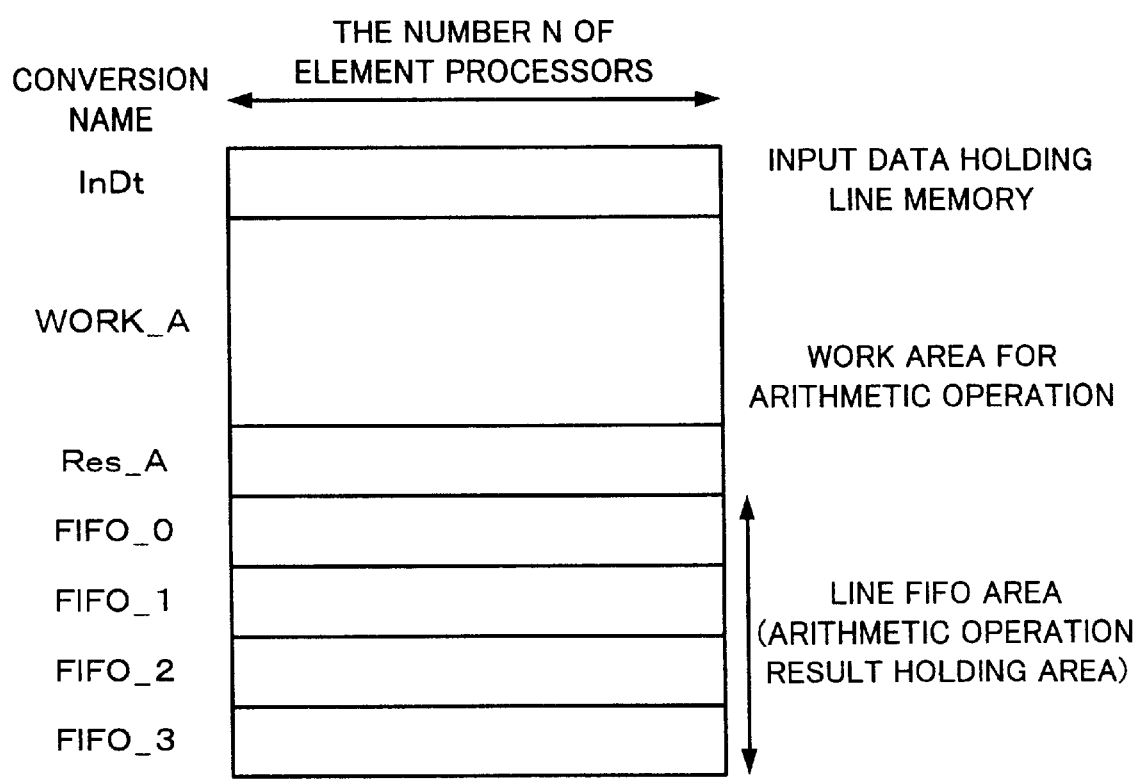
FIG. 12 is a schematic diagram showing an address map of a data memory section of one processor block in the example of the scanning line number converting circuit to which the invention is applied.

In case of performing the scanning line number conversion, a holding area of input data InDt, an area of working data WORK_A for arithmetic operation, an area of arithmetic operation result data Res_A, and an FIFO area to sequentially store line data FIFO_0 to FIFO_3 are provided for the data memory section 12 of the processor block 11 as shown in FIG. 12.

Each image data of one line sent from the input SAM unit 31 for the horizontal blanking period is first held in the holding area of the input data InDt of the data memory section 12.

In case of realizing the pixel number conversion in the horizontal direction and the filtering process, an arithmetic operating process is executed to the held input data InDt by the ALU array section 13. In this instance, as a work area at the time of the arithmetic operating process, the area of the working data WORK_A is used. An arithmetic operation result is held in the area of the arithmetic operation result data Res_A.

Each element processor Pn has a structure such that it can access to the data of the other element processors which are neighboring to the element processor Pn on the right and left sides. With such a structure, the pixel number conversion in the horizontal direction and the filtering arithmetic operation can be realized.

In case of performing only the scanning line number conversion, since such an arithmetic operating process is unnecessary, the input data InDt held in the data memory section 12 is directly moved to the area of the arithmetic operation result data Res_A.

The data stored in area of the arithmetic operation result data Res_A is held in the FIFO area of the designated write address. The write address of the FIFO area is updated and, in the next line, the data is held in the next FIFO area.

As mentioned above, the pixel data corresponding to four lines of FIFO_0 to FIFO_3 is held in the FIFO area.

When the data transfer is requested, the processor block 21 generates a data transfer flag from the command forming unit 24. The data transfer flag is sent to the data transfer flag setting unit 17 of the processor block 11.

The processor block 11 monitors the transfer request flag. When the transfer flag is set in the data transfer flag setting unit 17, the image data accumulated in the FIFO area of the processor block 11 is transferred to the data memory section 22 of the processor block 21.

Figure 13:
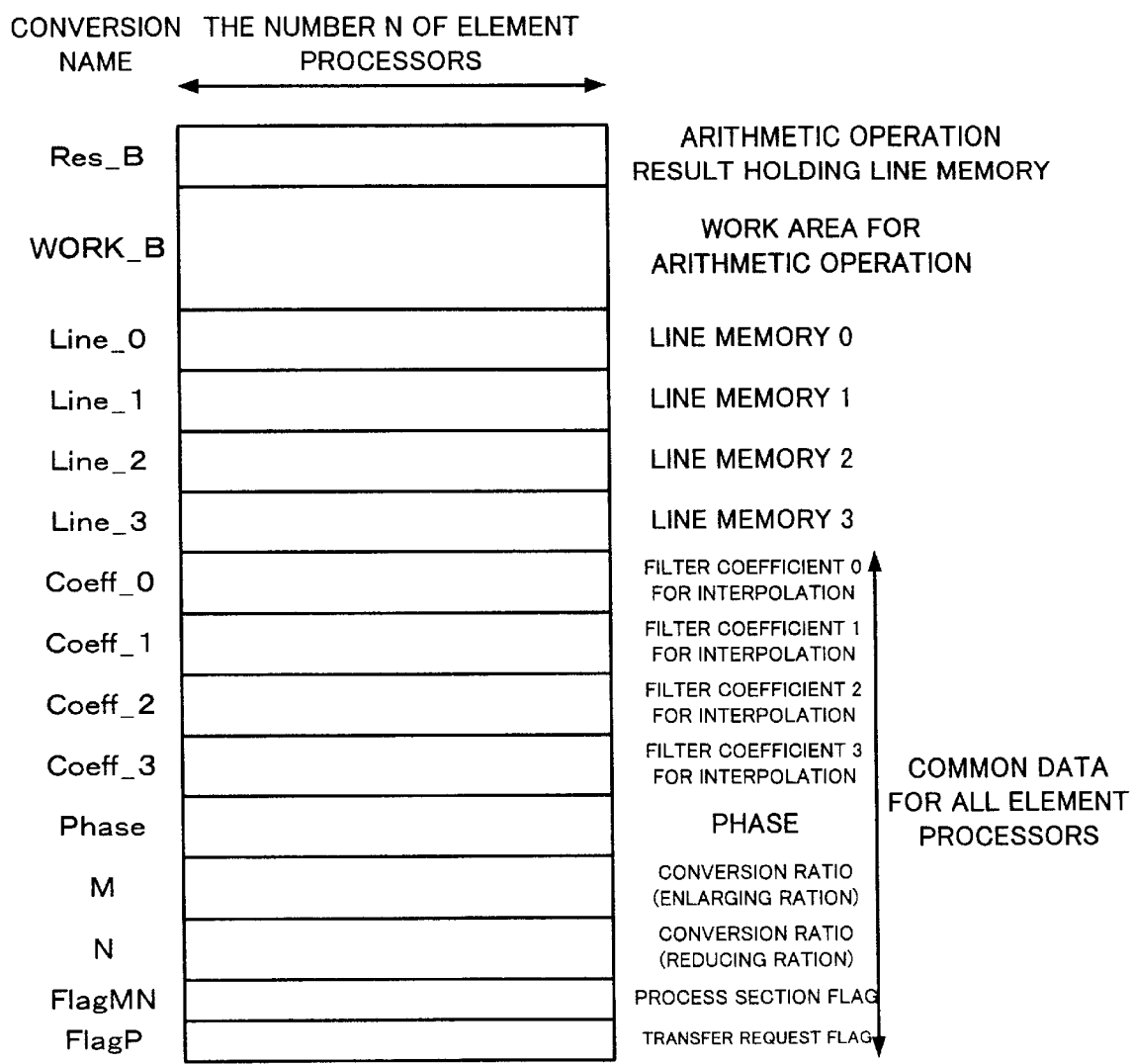
FIG. 13 is a schematic diagram showing an address map of a data memory section of the other processor block in the example of the scanning line number converting circuit to which the invention is applied.

As shown in FIG. 13, the data memory section 22 of the processor block 21 has: an area to hold arithmetic operation result data Res_B; an area for working data WORK_B at the time of the arithmetic operation; an area for line data Line_0 to Line_3 of four lines; an area of coefficient data Coeff_0 to Coeff_3 of a filter for interpolation; an area of phase data Phase; an area of data M of the conversion ratio (enlargement ratio); an area of data N of a conversion ratio (reduction ratio); an area of a process selection flag FlagMN; and an area of a transfer request flag FlagP.

The flag FlagMN indicates either the enlarging process or the reducing process. When the flag FlagMN is equal to "0", it means the enlargement. When the flag FlagMN is equal to "1", it means the reduction.

The meaning of the transfer request flag FlagP changes in dependence on whether the flag FlagMN is equal to "0" or "1". When the flag FlagMN is equal to "0", if the flag FlagP is equal to "0", it denotes the transfer of the 1-line data. When the flag FlagP is equal to "1", it denotes that the data is not transferred. When the flag FlagMN is equal to "1", if the flag FlagP is equal to "0", it denotes the transfer of the 1-line data. When the flag FlagP is equal to "1", it denotes that the 2-line data is transferred.

In case of performing the scanning line number conversion, first, a data transfer request flag is reset and the conversion ratio (enlargement ratio) area M and the conversion ratio (reduction ratio) area N are updated.

The line data is sent from the FIFO area of the processor block 11 and is held in the area of the line data Line_0 to Line_3.

In accordance with the phase data Phase, the values of the interpolation filter coefficients Coeff_0 to Coeff_3 are set. Interpolation data is formed by a convolution arithmetic operation on the basis of the values of the line data Line_0 to Line_3 and the values of the interpolation filter coefficients Coeff_0 to Coeff_3. The arithmetic operation result data is held in the area of data Res_B.

Specifically speaking, the above arithmetic operation is calculated by the following equation.

$$Res\_B = Coeff\_0 \times Line\_0 + Coeff\_1 \times Line\_1 + Coeff\_2 \times Line\_2 + Coeff\_3 \times Line\_3$$

in case of a filter of two taps of a linear interpolation or the like, it is calculated by the following equation.

$$Res\_B = Coeff\_0 \times Line\_0 + Coeff\_1 \times Line\_1$$

The interpolation filter coefficients Coeff_0 to Coeff_3 are, for example, filter coefficients to perform the interpolation of the cubic function.

A phase calculation is performed and a setting process of the transfer request flag FlagP is performed.

When the data transfer to the output SAM unit 32 is possible for the horizontal blanking period of the output video signal, the interpolation data is transferred from the processor block 21 to the output SAM unit 32. An output of the output SAM unit 32 is sent to the output signal display apparatus 3.

Figure 14A:
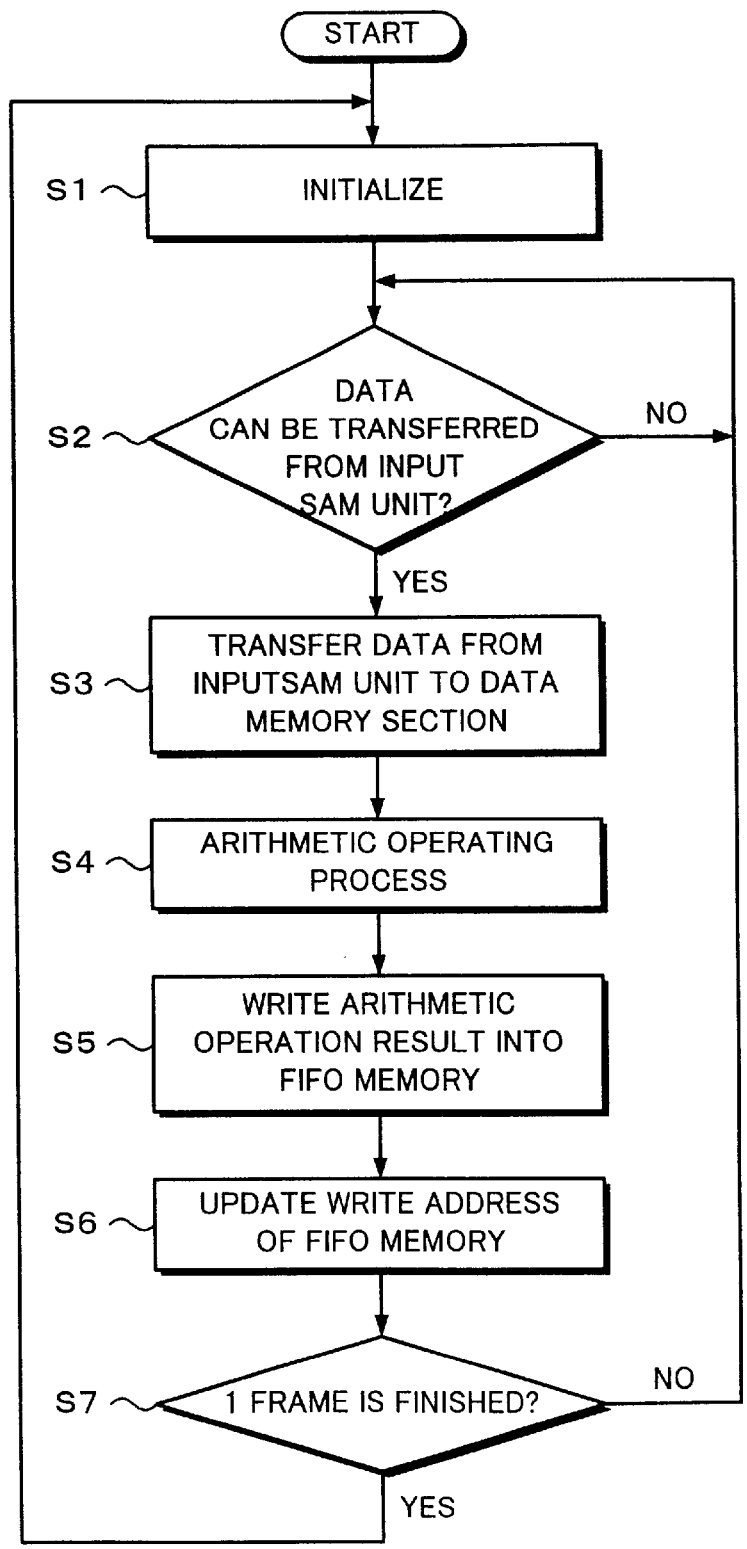
FIGS. 14A and 14B are flowcharts for use in explanation of processes of one processor block in the example of the scanning line number converting circuit to which the invention is applied.
Figure 14B:
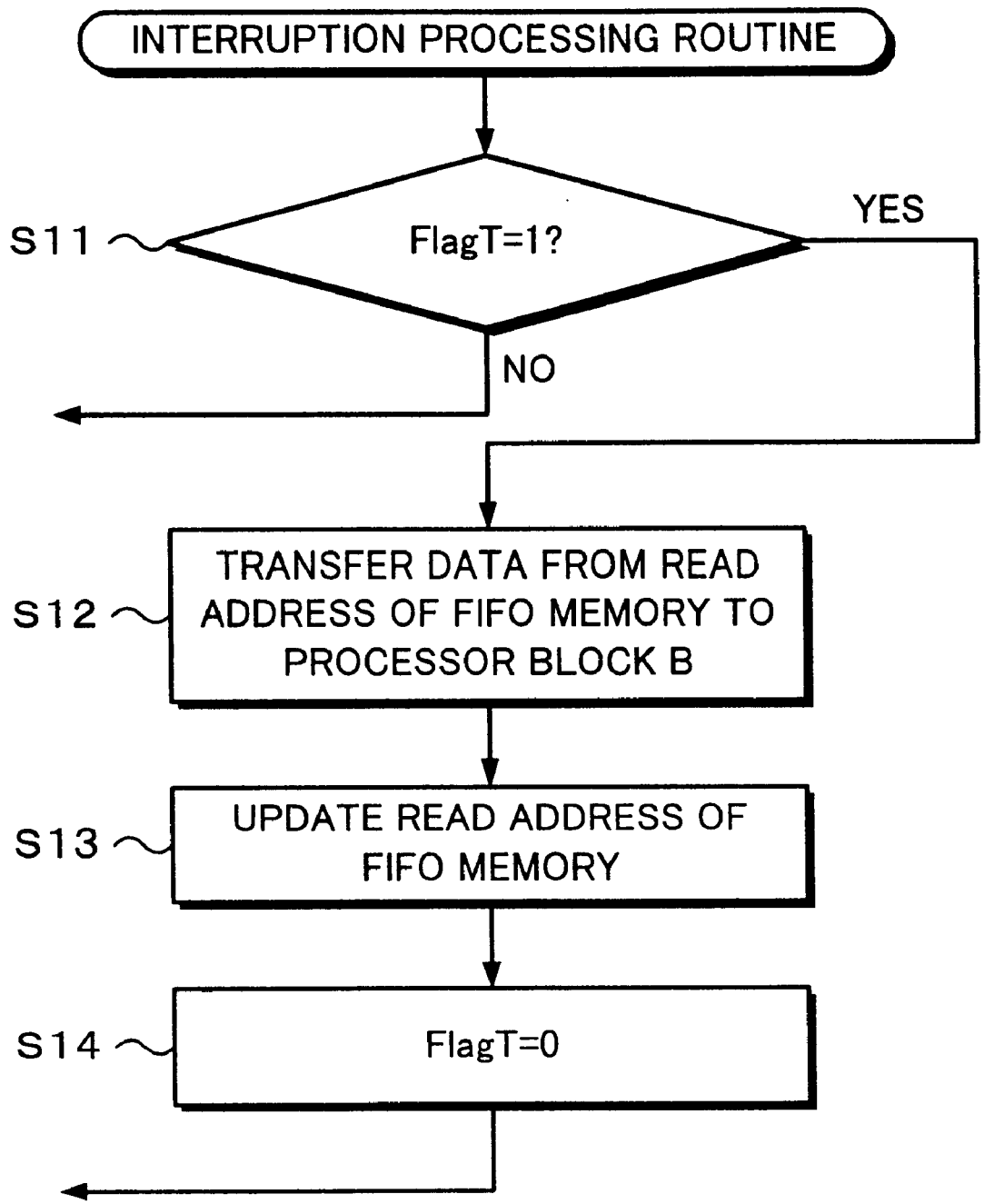

FIG. 14 is a flowchart showing the processes in the processor block 11. A program process is started after the program was loaded or the system was reset. First, in the initializing step (step S1), an initializing process necessary for the program processes such as initialization of variables, initialization of the line memory, and the like is performed.

A main routine in steps S2 to S7 is performed and the data transfer flag FlagT which is sent from the processor block 21 is monitored for this time interval. When the transfer request flag FlagT is detected, an interpolating process shown in steps S11 to S14 is started.

First, the main routine will be explained. In the main routine, the horizontal sync signal of the video signal from the input signal supplying apparatus 1 is monitored, thereby discriminating whether a time interval is a period during which the data transfer is possible or not (step S2). If it is a horizontal blanking period and the system is in a data transfer possible state, the processing routine advances to step S3. If NO, in step S2, the system is waited until it enters the data transfer possible state.

In step S3, the image data of one line held in the input SAM unit 31 is transferred as input data InDt to the holding area of the data memory section 12.

When the image data is transferred as input data InDt to the holding area of the data memory section 12, necessary arithmetic processes such as pixel number conversion in the horizontal direction, filtering arithmetic operation, and the like are performed. Arithmetic operation processing results are held as arithmetic operation result data Res_A into the data memory section 12 (step S4).

The data in the area of the arithmetic operation result data Res_A is written into the areas of FIFO_0 to FIFO_3 (step S5). The write addresses in the FIFO areas are sequentially updated (step S6).

Figure 15:
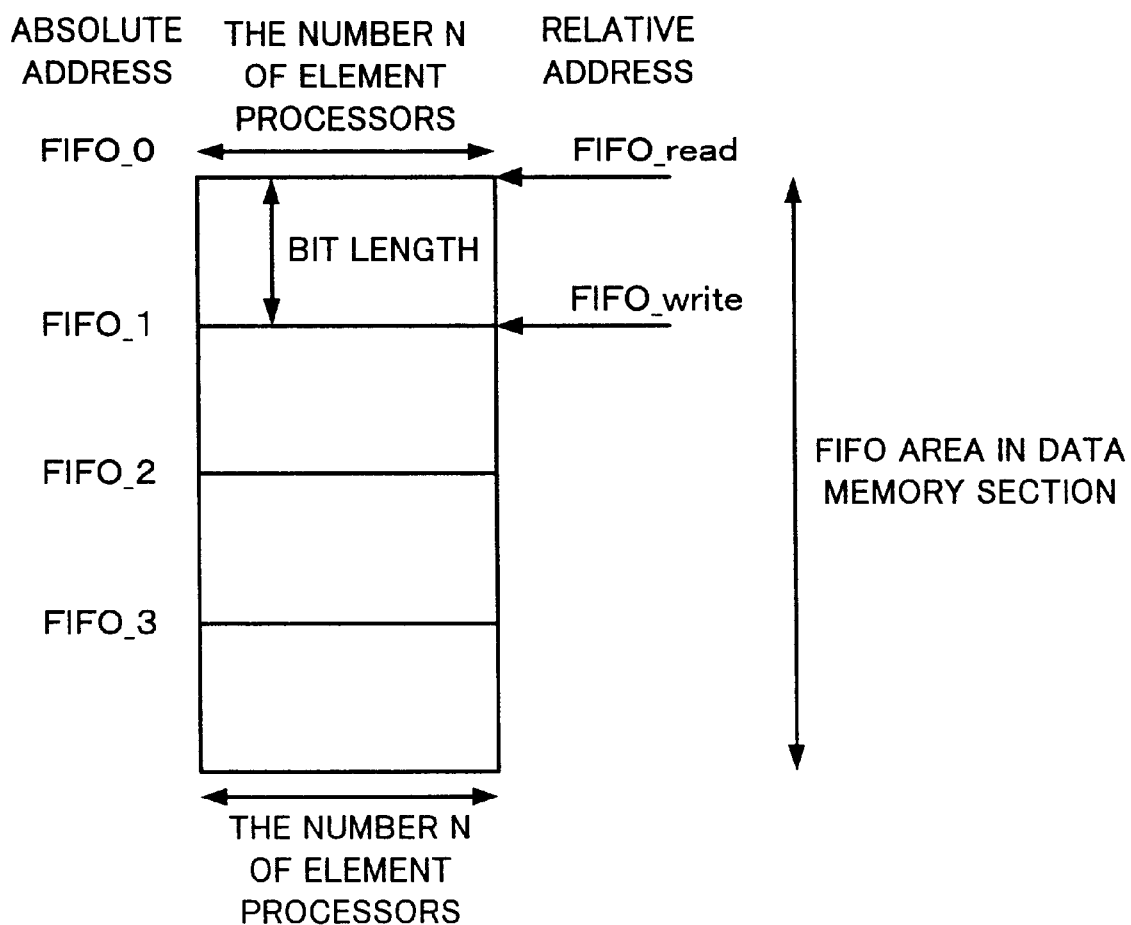
FIG. 15 is a schematic diagram for use in explanation of a line FIFO.

That is, write addresses FIFO_write into the FIFO areas are sequentially updated in accordance with the order of FIFO_1, FIFO_2, and AD_FIFO_3 as shown in FIG. 15.

When the data is accumulated in the FIFO area and the write addresses in the FIFO areas are updated, whether a position is the end of one frame or not is discriminated (step S7). If it is not the end of one frame, the processing routine is returned to step S2. If YES, the processing routine is returned to step S1.

An interpolation routine process will now be described. The data transfer flag FlagT which is sent from the processor block 21 to the data transfer flag setting unit 17 of the processor block 11 is monitored (step S11). If the data transfer flag FlagT is equal to "1", since this means that the transfer request has arrived from the processor block 21, an interpolating process is started.

When the interpolating process starts, the data in the areas of FIFO_0 to FIFO_3 of the data memory section 12 is read out and transferred to the processor block 21 (step S12). Read addresses FIFO read of the line FIFO areas are updated (step S13). The data transfer flag FlagT is reset (step S14). The processing routine skips the interpolation processing routine and is returned to the program process of the main routine which has been executed before the interpolation processing routine.

Figure 16:
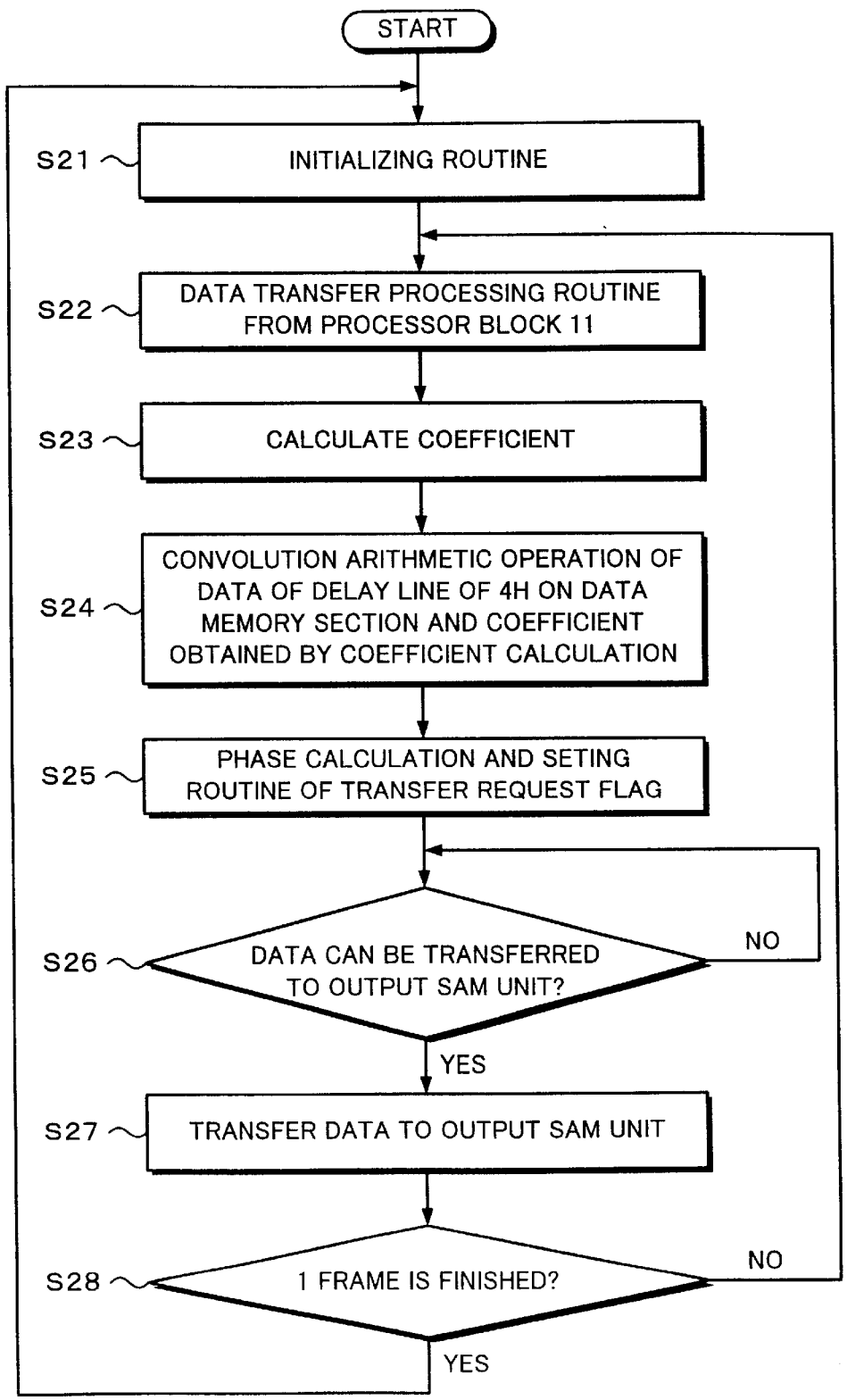
FIG. 16 is a flowchart for use in explanation of processes of the other processor block in the example of the scanning line number converting circuit to which the invention is applied.

Processes in the processor block 21 will now be described. FIG. 16 is a flowchart showing the processes in the processor block 21.

After the program was loaded or after the system was reset, an initializing process necessary for the program process is executed (step S21). An initializing routine will be described in detail hereinlater.

When the initializing routine is performed, a data transfer processing routine from the processor block 11 is executed (step S22). The data transfer processing routine will be described in detail hereinlater. When the data transfer processing routine from the processor block 11 is executed, an interpolating routine (steps S23 to S25) is started.

In the interpolating routine, filter coefficients for interpolation are first calculated from the phase data Phase or interpolation function. The filter coefficients are stored into the data memory section 22 as data Coeff_0 to Coeff_3 of the filter coefficients for interpolation (step S23). For example, a cubic function is used as an interpolation function.

As for the filter coefficients for interpolation, it is also possible to previously store the filter coefficients into a coefficient memory and to select the filter coefficients in accordance with the phase data.

The line data stored in the data memory section 22 as data Line_0 to Line_3 and the interpolation filter coefficients obtained in step S23 are sent to the ALU array section 23 and an interpolation arithmetic operation is performed. The resultant interpolation data obtained is held as holding data Res_B (step S24).

When the interpolation data is obtained, processes of the phase calculation and the setting routine of the transfer request flag are executed (step S25). The interpolation arithmetic operating routine is completed. The processes of the phase calculation and the setting routine of the transfer request flag will be described in detail hereinlater.

When the interpolation arithmetic operating process is finished in steps S23 to S25, the horizontal sync signal of the output video signal which is generated from the output vertical sync signal forming unit 6 is monitored and whether the horizontal blanking period has come and the system has entered the data transfer possible state or not is discriminated (step S26). When it is determined that the data can be transferred, the data Res_B obtained by the interpolation arithmetic operation is transferred to the output SAM unit 32 (step S27).

The vertical sync signal of the input video signal which is supplied from the input signal supplying apparatus 1 is monitored and whether the system is in a state showing the end of one frame or not is discriminated from the vertical sync signal of the input video signal (step S28). If it is determined to be the end of one frame, the processing routine is returned to step S21. If NO, the processing routine is returned to step S22.

Figure 17:
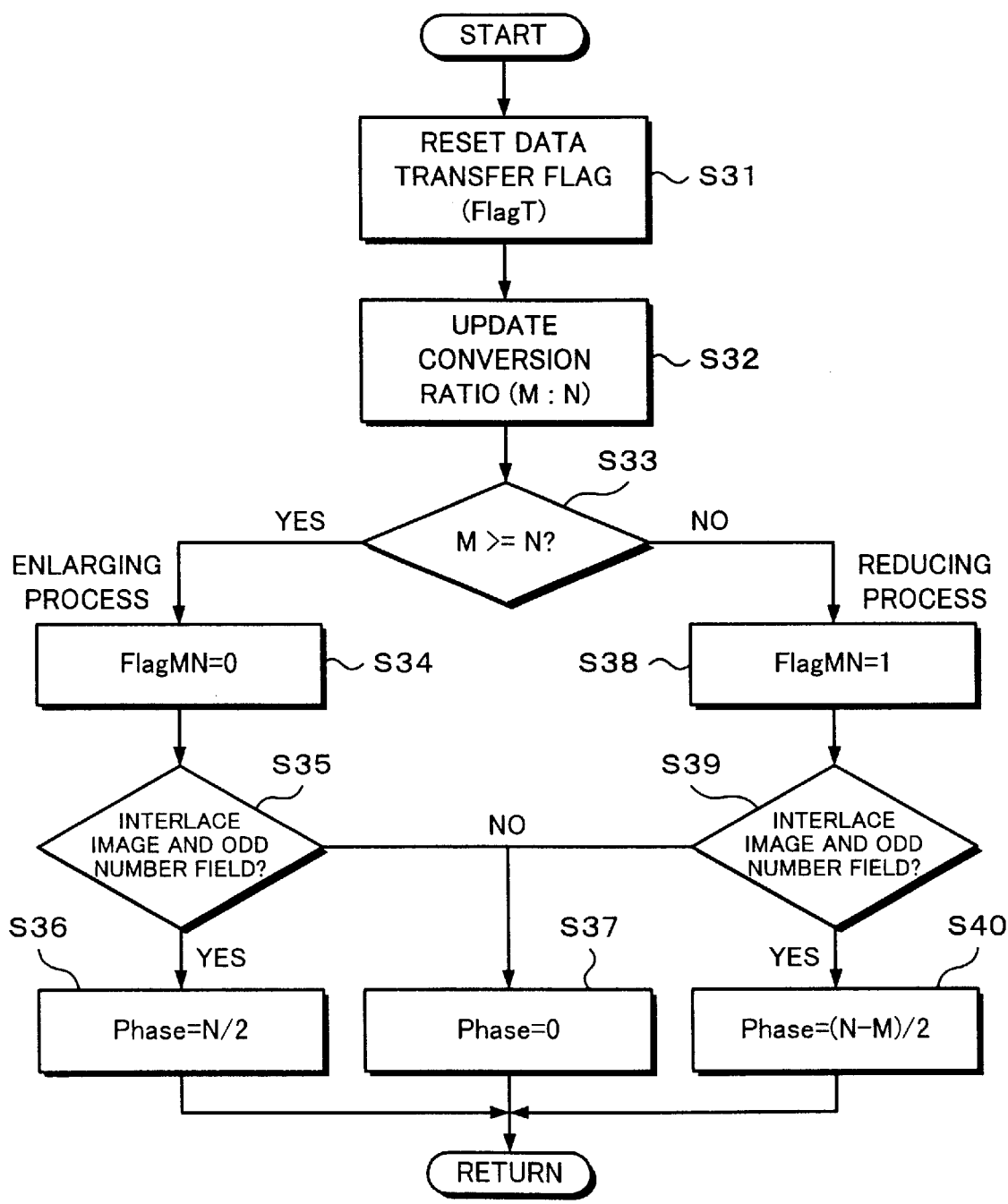
FIG. 17 is a flowchart for use in explanation of processes of the other processor block in the example of the scanning line number converting circuit to which the invention is applied.

FIG. 17 is a flowchart showing the initializing routine (step S21 in FIG. 16). In the initializing routine, the data transfer request flag FlagT is reset (step S31). The conversion ratio (M:N) is updated (step S32).

The data M of the enlargement ratio and the data N of the reduction ratio are compared, thereby discriminating either the enlarging process or the reducing process (step S33).

When the data M of the enlargement ratio is larger than the data N of the reduction ratio, it is determined to be the enlarging process and the process selection flag FlagMN is set to "0" (step S34). When the process selection flag FlagMN is set to "0", a check is made to see if the image is the interlace image and the field is the odd number field (step S35). In case of the interlace image and the odd number field, the phase data Phase is set to (Phase=N/2) (step S36). If NO, the phase data Phase is set to (Phase=0) (step S37) and the processing routine is returned.

When the data M of the enlargement ratio is smaller than the data N of the reduction ratio in step S33, it is determined to be the reducing process and the process selection flag FlagMN is set to "1" (step S38). When the process selection flag FlagMN is set to "1", a check is made to see if the image is the interlace image and the field is the odd number field (step S39). In case of the interlace image and the odd number field, the phase data Phase is set to Phase=(N−M)/2 (step S40).

If NO, the phase data Phase is set to (Phase=0) (step S37) and the processing routine is returned.

Figure 18:
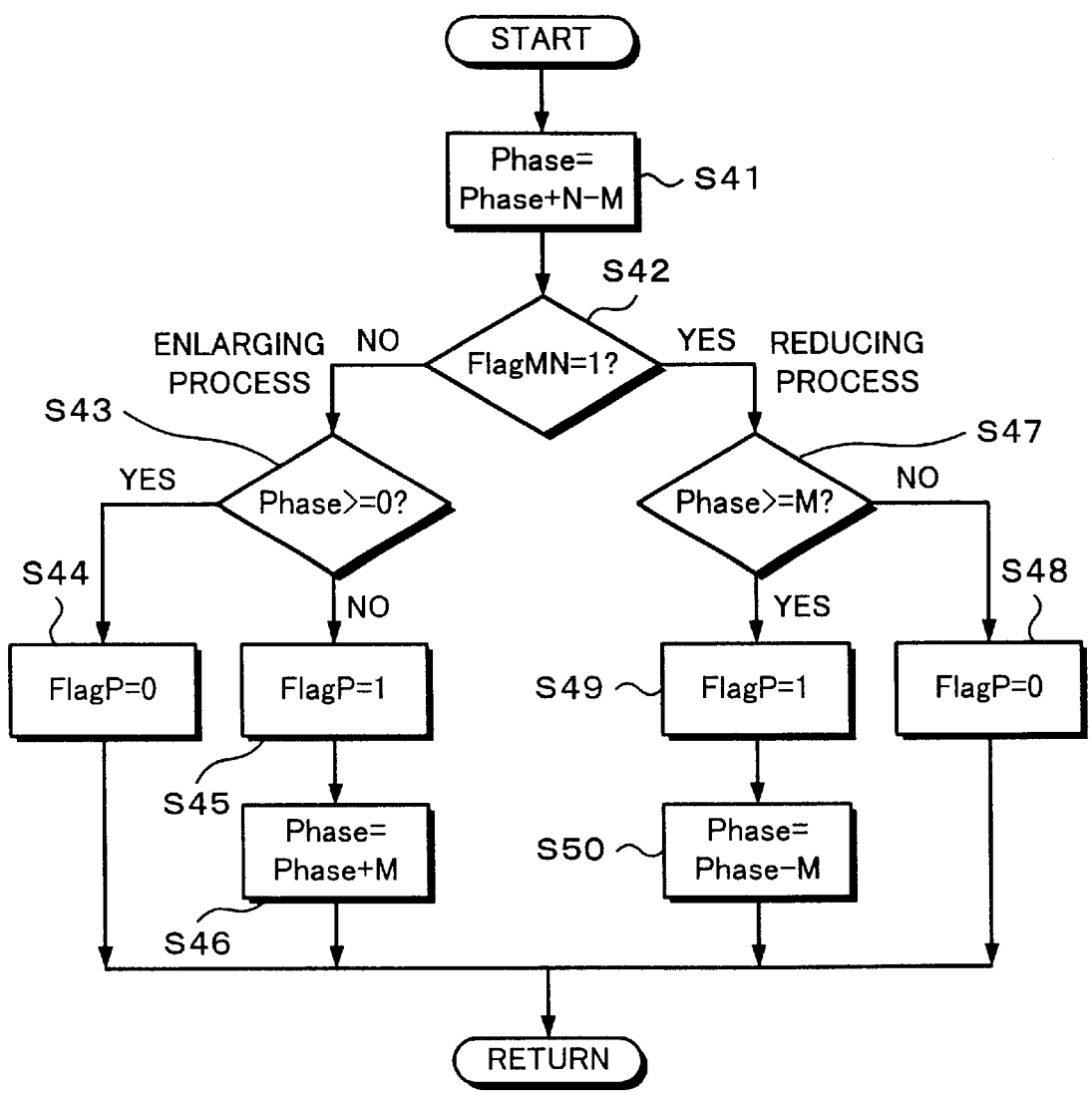
FIG. 18 is a flowchart for use in explanation of processes of the other processor block in the example of the scanning line number converting circuit to which the invention is applied.

FIG. 18 shows a phase calculation and the setting routine of the transfer request flag (step S25).

First, the phase data Phase is set to Phase=Phase+M−N (step S41).

A check is made to see if the process selection flag FlagMN showing either the enlarging process or the reducing process is equal to "1" (step S42).

When it is determined that the process selection flag FlagMN is equal to "0" and the process is the enlarging process, whether the phase data Phase is equal to or larger than "0" or not is discriminated (step S43). If the phase data Phase is equal to or larger than "0", the transfer request flag FlagP is set to "0" (step S44) and the processing routine is returned. When the phase data Phase is less than "0", the transfer request flag FlagP is set to "1" (step S45). The phase data Phase is set to Phase=Phase+M (step S46). The processing routine is returned.

When it is determined in step S42 that the process selection flag FlagMN is equal to "1" and the process is the reducing process, whether the phase data Phase is equal to or larger than "M" or not is discriminated (step S47). If the phase data Phase is less than "M", the flag FlagP is set to "0" (step S48). When the phase data Phase is equal to or larger than "M", the flag FlagP is set to "1" (step S49) and the phase data Phase is set to Phase=Phase−M (step S50). The processing routine is returned.

Figure 19:
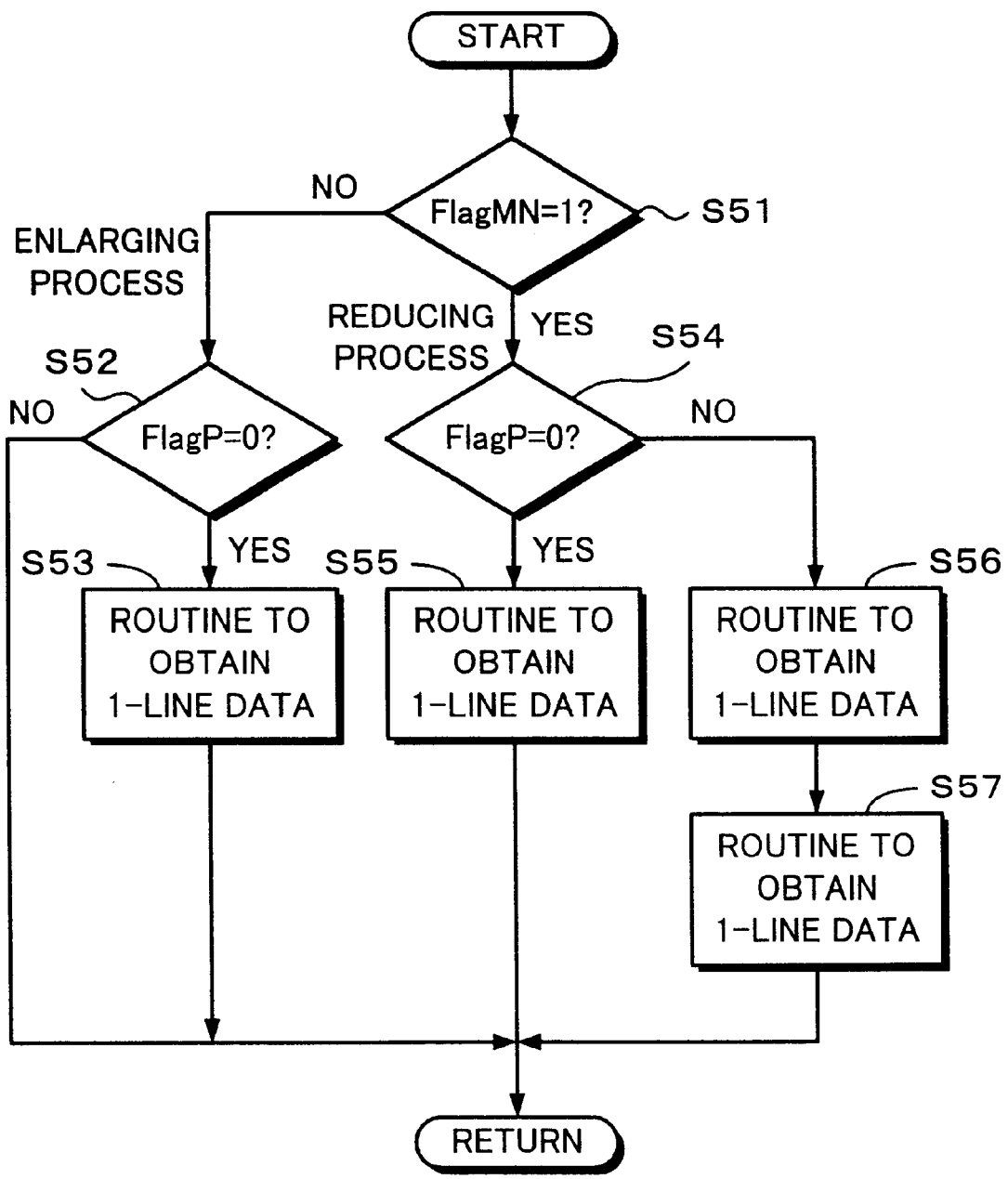
FIG. 19 is a flowchart for use in explanation of processes of the other processor block in the example of the scanning line number converting circuit to which the invention is applied.

FIG. 19 is a flowchart showing a data transfer processing routine (step S22 in FIG. 16) from the processor block 11.

First, a check is made to see if the process selection flag FlagMN is equal to "1" (step S51).

When it is determined that the process selection flag FlagMN is equal to "0" and the process is the enlarging process, a check is made to see if the transfer request flag FlagP is equal to "0" (step S52). In case of the enlarging process, (FlagP=0) denotes that the 1-line data is obtained. (FlagP=1) means that the data is not obtained.

Figure 20:
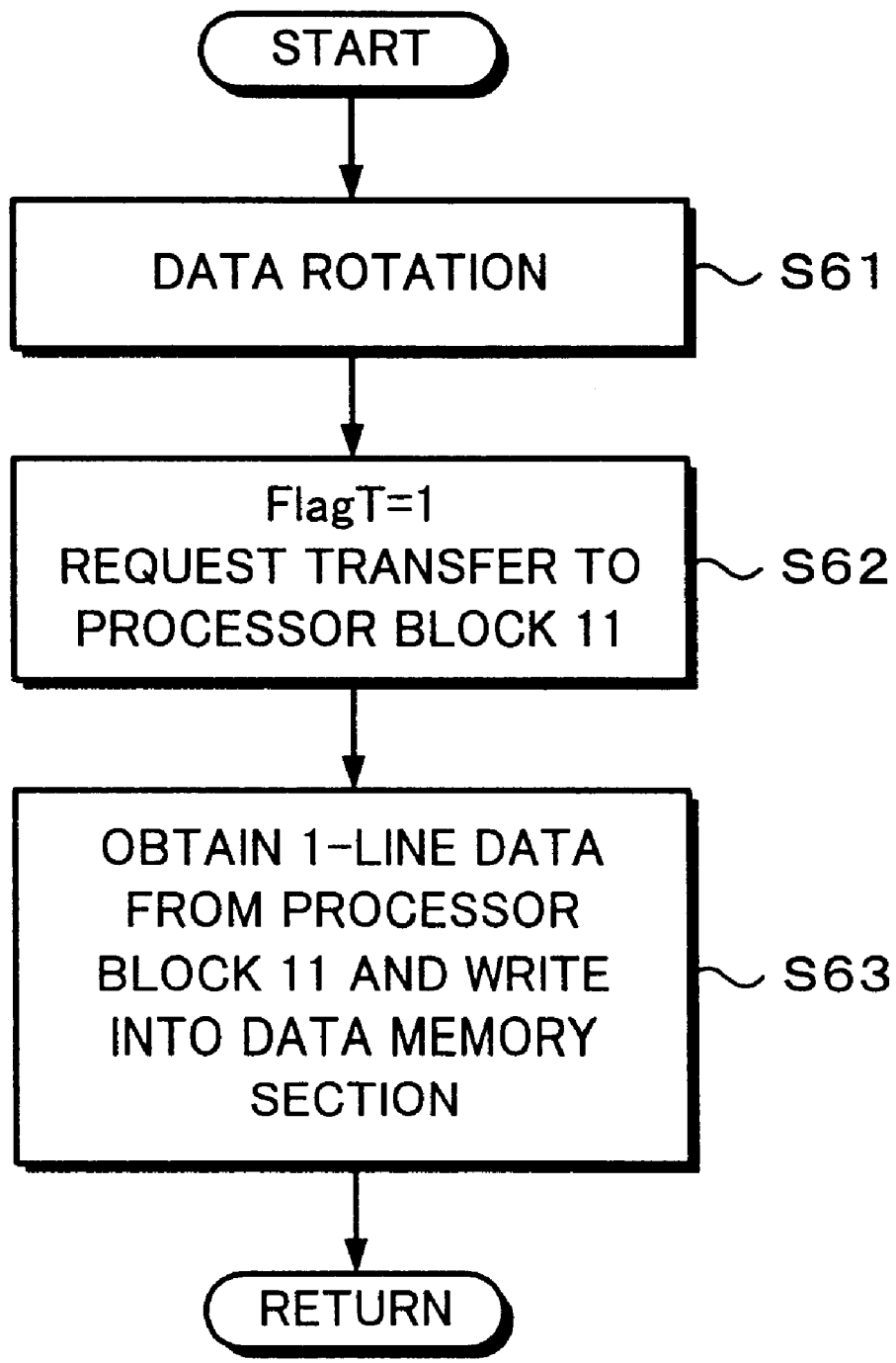
FIG. 20 is a flowchart for use in explanation of processes of the other processor block in the example of the scanning line number converting circuit to which the invention is applied.

When it is decided in step S52 that (FlagP=0) is equal to "0", a process of the data obtaining routine of one line is performed (step S53). The processing routine is returned. The 1-line data obtaining routine process is shown in FIG. 20.

When it is decided in step S52 that (FlagP=0) is equal to "1", the data is not obtained and the processing routine is returned as it is.

When it is decided in step S51 that the process selection flag FlagMN is equal to "1" and the process is the reducing process, a check is made to see if the FlagP is equal to "0" (step S54). In case of the reducing process, (FlagP=0) denotes that the 1-line data is obtained and (FlagP=1) means that the 2-line data is obtained.

When it is decided in step S52 that the transfer request flag FlagP is equal to "0", the 1-line data obtaining routine process is performed (step S55). The processing routine is returned.

When it is determined in step S54 that the transfer request flag FlagP is equal to "1", the 1-line data obtaining routine process is performed (step S56). Further, the 1-line data obtaining routine process is executed (step S57). The processing routine is returned.

FIG. 20 shows the data obtaining routine process (steps S53, S55, S56, S57). In the data obtaining routine, a data rotating process is first performed. According to the data rotating process, in case of performing an interpolation arithmetic operation of four taps, the data is rotated so that Line_3 always holds the latest line with respect to the time. Specifically speaking, the data rotation is realized by performing the data transfer three times as will be explained hereinbelow or by an address rotation.

Line_0<-Line_1
Line_1<-Line_2
Line_2<-Line_3

When the data rotating process is executed, the data transfer flag FlagT is set to "1" and the transfer request is sent to the processor block 11 (step S62).

In the processor block 11, as shown in step S11 in FIG. 14, the data transfer flag FlagT is monitored and the interrupting process is executed. Therefore, when the flag FlagT is set to "1" in step S62, the data of one line is transferred from the processor block 11. The 1-line data is obtained and is written into the areas of Line_0 to Line_1 of the data memory section 22 (step S63).

As mentioned above, in the scanning line number conversion to which the invention is applied, the data memory section 12 of the processor block 11 at the first stage is allowed to function as an FIFO, the data is transferred from the processor block 11 at the first stage to the processor block 21 at the next stage at a necessary timing, and the interpolation arithmetic operation is performed and the scanning line number conversion is performed in the processor block 21 at the next stage. Thus, the scanning line number conversion can be performed without using any field memory.

FIGS. 21A to 21G are timing charts showing the operation in case of the enlarging process. In this example, the scanning line number conversion of (2:3) is performed and the enlarging process of M=3 and N=2 is executed.

FIG. 21A shows the vertical sync signal of the input video signal. FIG. 21B shows the horizontal sync signal of the input video signal. FIG. 21C shows the signal of each line of the input video signal. FIG. 21D shows the processes in the processor block 11. The fetching routine of the data from the input SAM unit 31 and the arithmetic operating routine in the processor block 11 are executed at timings as shown in FIG. 22.

FIG. 21E shows the processes in the processor block 21. FIG. 21F shows each line of the output video signal. FIG. 21G shows the horizontal sync signal of the output video signal. The data transfer routine to the output SAM unit 32 in the processor block 21 and the data transfer routine from the processor block 11 to the processor block 21 and the interpolation arithmetic operating routine are performed at timings as shown in FIG. 23.

When a time point t0 of the vertical sync signal (FIG. 21A) of the input video signal comes, as shown in FIG. 21D, the initializing process of the processor block 11 is performed. The initializing process shows the process in step S1 in FIG. 14. By this initializing routine, initializing processes which are necessary for the program process such as initialization of variables, initialization of the line memory, and the like are executed.

When the time point t0 of the vertical sync signal (FIG. 21A) of the input video signal comes, as shown in FIG. 21E, the initializing process of the processor block 21 is performed. The initializing process is executed as shown in FIG. 17.

That is, the data transfer request flag FlagT is reset by the initializing process of the processor block 21. The conversion ratio (M:N) is updated. In this instance, since (M=3, N=2), it is determined that the process is the enlarging process and the process selection flag FlagMN is set to "0". If the image is not the interlace image and the field is not the odd number field, the phase data Phase is set to (Phase=0).

When a period of the horizontal sync signal comes at time point t2, the data can be transferred from the input SAM unit 31 to the processor block 11. As shown in FIG. 21D, the video signal (Line0) of one line is transferred to the data memory section 12 of the processor block 11. The arithmetic operation is performed in the processor block 11. The data (Line0) is held as data FIFO_0 into the data memory section 12 at time point t11.

The video signal (Line1) of the next one line is inputted for a time interval between time points t2 and t3. This 1-line video signal is inputted to the input SAM unit 31.

When a period of the horizontal sync signal comes at time point t3, the data can be transferred from the input SAM unit 31 to the processor block 11. As shown in FIG. 21D, the 1-line video signal (Line1) is transferred to the data memory section 12 of the processor block 11. The arithmetic operating process is executed in the processor block 11. The data (Line1) is held as data FIFO_1 into the data memory section 12 at time point t12.

The video signal (Line2) of the next one line is inputted for a time interval between time points t3 and t4. This 1-line video signal is inputted to the input SAM unit 31.

In the processor block 11, similar processes are repeated hereinbelow and the line data is held into the FIFO area.

When a period of the horizontal sync signal of the output video signal (FIG. 21G) comes at time point t21, as shown in FIG. 21E, the data can be transferred from the processor block 21 to the output SAM unit 32.

When the data is transferred to the output SAM unit 32 at time point t21, a data transfer processing routine to transfer the data from the processor block 11 to the processor block 21 is started (step S22). The data (Line0) of one line is transferred from the processor block 11.

When the data transferring process from the processor block 11 to the processor block 21 is executed, an interpolation arithmetic operating routine is started in the processor block 21. In this instance, since the phase data Phase is equal to "0", an interpolation arithmetic operation is executed in step S24 by the coefficient data in which the phase data Phase corresponds to "0".

Subsequently, the phase calculation and the setting routine of the data transfer flag (FIG. 18) are started.

Since the phase data Phase is equal to "0" and (M=3, N=2) so far, the phase data Phase is set to Phase=0+2−3=−1 (step S41).

Since (Phase=−1) is smaller than "0", in step S45, the next transfer request flag FlagP is set to FlagP=1 In step S46, the next phase data Phase is set to Phase=−1+3=2

When a period of the horizontal sync signal of the output video signal comes at time point t22, the data can be transferred to the output SAM unit 32. When the data is transferred to the output SAM unit 32, the data transfer processing routine from the processor block 11 to the processor block 21 is started (step S22).

In this instance, the transfer request flag FlagP is equal to "1". As shown in step S52 in FIG. 19, when the flag FlagP is equal to "1" in the data transfer processing routine, the data transferring process from the processor block 11 to the processor block 21 is not executed.

In the processor block 21, the interpolation arithmetic operation processing routine is started. In this instance, since the phase data Phase is equal to "2", an interpolation arithmetic operation is executed in step S24 by the coefficient data in which the phase data Phase corresponds to "2".

Subsequently, in step S25, the phase calculation and the setting routine of the data transfer flag (FIG. 18) is started.

Since the phase data Phase is equal to "2" and (M=3, N=2) so far, the phase data Phase is set to Phase=+2+3−3=1 (step S41).

Since (Phase=1) is larger than "0", in step S45, the next flag FlagP is set to FlagP=0

When a period of the horizontal sync signal of the output video signal comes at time point t23, the data can be transferred to the output SAM unit 32. When the data is transferred to the output SAM unit 32, the data transfer processing routine from the processor block 11 to the processor block 21 is started (step S22).

When the data is transferred to the output SAM unit 32 at time point t23, the data transfer processing routine from the processor block 11 to the processor block 21 is started (step S22).

In this instance, since the flag FlagP is equal to "0", as shown in step S53 in FIG. 19, the data (Line1) of one line is transferred from the processor block 11.

When the data transferring process from the processor block 11 to the processor block 21 is executed, in the processor block 21, the interpolation arithmetic operation processing routine is started. In this instance, since the phase data Phase is equal to "1", an interpolation arithmetic operation is executed in step S24 by the coefficient data in which the phase data Phase corresponds to "1".

Subsequently, in step S25, the phase calculation and the setting routine of the data transfer flag (FIG. 18) are started.

Since the phase data Phase is equal to "1" and (M=3, N=2) so far, the phase data Phase is set to Phase=1+2−3=0 (step S41).

Therefore, the next flag FlagP is set to FlagP=0.

Similar processes are repeated hereinbelow. As mentioned above, the flag FlagP is set to "0", "1", "0", "0", "1", . . . When "0" continues twice, the flag FlagP is set to "1" once. When the flag FlagP is equal to "0", the data of one line is transferred. When the flag FlagP is equal to "1", the data transfer is not performed. As shown in FIG. 21F, therefore, the data of three lines is formed for two lines and the scanning line number conversion of (3:2) is executed.

FIGS. 24A to 24G are timing charts showing the operation in case of the reducing process. In this example, the scanning line number conversion of (2:3) is executed and the reducing process of M=2 and N=3 is performed.

FIG. 24A shows the vertical sync signal of the input video signal. FIG. 24B shows the horizontal sync signal of the input video signal. FIG. 24C shows the signal of each line of the input video signal. FIG. 24D shows the processes in the processor block 11.

When time point t100 of the vertical sync signal (FIG. 24A) of the input video signal comes, as shown in FIG. 24D, the initializing process of the processor block 11 is executed.

FIG. 24E shows the processes of the processor block 21. FIG. 24F shows each line of the output video signal. FIG. 24G shows the horizontal sync signal of the output video signal. When time point t100 of the vertical sync signal (FIG. 24A) of the input video signal comes, as shown in FIG. 24E, the initializing process of the processor block 21 is performed.

That is, the data transfer request flag FlagT is reset by the initializing process of the processor block 21. The conversion ratio (M:N) is updated. In this instance, since (M=2, N=3), it is decided that the process is the reducing process. The process selection flag FlagMN is set to "1". If the image is not the interlace image and the field is not the odd number field, the phase data Phase is set to (Phase=0).

When a period of the horizontal sync signal comes at time point t102, the data can be transferred from the input SAM unit 31 to the processor block 11. As shown in FIG. 24D, the video signal (Line0) of one line is transferred to the data memory section 12 of the processor block 11. The arithmetic operating process is executed in the processor block 11. The data (Line0) is held as data FIFO_0 into the data memory section 12 at time point t111.

The video signal (Line1) of the next one line is inputted for a time interval between time points tl02 and tl03. This 1-line video signal is inputted to the input SAM unit 31.

When the period of the horizontal sync signal comes at time point t103, the data can be transferred from the input SAM unit 31 to the processor block 11. As shown in FIG. 24D, the 1-line video signal (Line1) is transferred to the data memory section 12 of the processor block 11. The arithmetic operating process is executed in the processor block 11. This data (Line1) is held as data FIFO_1 in to the data memory section 12 at time point t12.

The video signal (Line2) of the next one line is input ted for a time interval between time points t103 and t104. This 1-line video signal is inputted to the input SAM unit 31.

In the processor block 11, similar processes are repeated hereinbelow and the line data is held into the FIFO area.

When a period of the horizontal sync signal of the output video signal (FIG. 24G) comes at time point t121, as shown in FIG. 24E, the data can be transferred from the processor block 21 to the output SAM unit 32.

When the data is transferred to the output SAM unit 32 at time point t121, a data transfer processing routine to transfer the data from the processor block 11 to the processor block 21 is started (step S22).

Since the flag FlagP is equal to "1" at this time, as shown in step S56 and S57 in FIG. 19, the data (Line0, Line1) of two lines is transferred from the processor block 11.

When the data transferring process from the processor block 11 to the processor block 21 is executed, an interpolation arithmetic operating routine is started in the processor block 21.

In this instance, since the phase data Phase is equal to "0", an interpolation arithmetic operation is executed in step S24 by the coefficient data in which the phase data Phase corresponds to "0".

Subsequently, the phase calculation and the setting routine of the data transfer flag (FIG. 18) are started in step S25.

Since the phase data Phase is equal to "0" and (M=2, N=3) so far, the phase data Phase is set to Phase=0+3−2=1 (step S41).

Since (Phase=1) is smaller than "M (M=2)", in step S48, the next transfer request flag FlagP is set to FlagP=0

When the period of the horizontal sync signal of the output video signal comes at time point t122, the data can be transferred to the output SAM unit 32. When the data is transferred to the output SAM unit 32, the data transfer processing routine from the processor block 11 to the processor block 21 is started (step S22)

In this instance, the transfer request flag FlagP is equal to "0". When the flag FlagP is equal to "0", as shown in step S55 in FIG. 19, the data (Line2) of one line is transferred from the processor block 11.

When the data transferring process from the processor block 11 to the processor block 21 is executed, in the processor block 21, the interpolation arithmetic operation processing routine is started. In this instance, since the phase data Phase is equal to "1", an interpolation arithmetic operation is executed in step S24 by the coefficient data in which the phase data Phase corresponds to "1".

Subsequently, in step S25, the phase calculation and the setting routine of the data transfer flag (FIG. 18) are started.

Since the phase data Phase is equal to "1" and (M=2, N=3) so far, the phase data Phase is set to Phase=1+3−2=2 (step S41).

Since (Phase 2) is equal to "M (M=2)", in step S49, the next transfer request flag FlagP is set to FlagP=1

The phase data Phase is set to Phase=2−2=0 (step S50).

When a period of the horizontal sync signal of the output video signal comes at time point t123, the data can be transferred to the output SAM unit 32: When the data is transferred to the output SAM unit 32, the data transfer processing routine from the processor block 11 to the processor block 21 is started (step S22)

When the data is transferred to the output SAM unit 32 at time point t123, the data transfer processing routine to transfer the data from the processor block 11 to the processor block 21 is started (step S22).

In this instance, since the transfer request flag FlagP is equal to "1", as shown in steps S56 and S57 in FIG. 19, the data (Line3, Line4) of two lines is transferred from the processor block 11.

When the data transferring process from the processor block 11 to the processor block 21 is executed, in the processor block 21, the interpolation arithmetic operation processing routine is started. In this instance, since the phase data Phase is equal to "0", an interpolation arithmetic operation is executed in step S24 by the coefficient data in which the phase data Phase corresponds to "0".

Subsequently, in step S25, the phase calculation and the setting routine of the data transfer flag (FIG. 18) are started. Since the phase data Phase is equal to "0" and (M=2, N=3) so far, the phase data Phase is set to Phase=0+3−2=1 (step S41).

Therefore, the next flag FlagP is set to FlagP=0.

Similar processes are repeated hereinbelow. As mentioned above, the flag FlagP is set to "0", "1", "0", "1", . . . The flag FlagP is repetitively set to "0" or "1". When the flag FlagP is equal to "0", the data of one line is transferred. When the flag FlagP is equal to "1", the data of two lines is transferred. Therefore, two lines of the output video signal is outputted from three lines of the input video signal and the scanning line number conversion of (2:3) is executed.

According to the invention, the linear array type multi-parallel processor using the SIMD type architecture which comprises the input SAM unit, two processor blocks, and output SAM unit and operates when a similar command is given to each element processor is used, one processor block is allowed to function as an FIFO, the interpolation arithmetic operation is executed in the other processor block, and the transfer request is sent to one processor block from the other processor block. Thus, the scanning line number conversion can be performed in a real-time manner without using any field memory.

According to the invention, the transfer request is sent to one processor block from the other processor block in accordance with the conversion ratio information based on the ratio between the number of scanning lines of the input image data and the number of scanning lines of the output image data and the phase information. Therefore, by switching the phase information in accordance with the conversion ratio, the scanning line number conversion can be performed at an arbitrary ratio in a real-time manner.

According to the invention, phase information that is different in the first and second fields is set as initial values into the image signal of the interlace system. The same phase information is set as an initial value into the image signal of the non-interlace system. Therefore, the invention can cope with both of the case of the interlace system and the case of the non-interlace system.

The present invention is not limited to the foregoing embodiments but many modifications and variations are possible within the spirit and scope of the appended claims of the invention.

What is claimed is:

1. A scanning line number converting apparatus comprising:

input image data storing means for inputting 2-dimensional image data and arranging and storing said inputted 2-dimensional image data in correspondence to each pixel in a line direction;

a first processor comprising first temporary storing means for inputting the image data arranged in correspondence to the pixels in the line direction by said input image data storing means and for temporarily storing the image data of a plurality of lines and first arithmetic operation processing means for performing an arithmetic operating process to the image data stored in said first temporary storing means;

first control means for giving a control command to said first processor;

a second processor comprising second temporary storing means for inputting the image data from said first processor and for temporarily storing the image data of a plurality of lines and second arithmetic operation processing means for performing an arithmetic operating process to the image data stored in said second temporary storing means;

second control means for giving a control command to said second processor; and output line data storing means to which the image data from said second processor is transferred every line and which arranges and stores and sequentially outputs said image data in correspondence to the pixels in the line direction, wherein said first and second processors have a construction such that each column constructs element processors and a common command is given to each of said columns by said first and second control means, said first temporary storing means of said first processor is allowed to function as a first-in first-out register to temporarily store the image data of a plurality of lines, said second processor generates a transfer request signal and sends said transfer request signal to said first processor, said first processor transfers the image data to said second processor in response to said transfer request signal, and a predetermined interpolation arithmetic operating process is performed in said second processor, thereby performing a scanning line number conversion.

2. An apparatus according to claim 1, wherein a plurality of areas each for accumulating the image data of one line are provided for said first temporary storing means of said first processor, write addresses and read addresses of said plurality of image data of one line are sequentially advanced, and said first temporary storing means of said first processor is allowed to function as a first-in first-out register to temporarily store the image data of a plurality of lines.

3. An apparatus according to claim 1, wherein the image processing arithmetic operation in a horizontal direction is performed by said first processor.

4. An apparatus according to claim 1, wherein an area to accumulate the image data of a plurality of lines transferred from said first processor and an area to store coefficients to perform said predetermined interpolation arithmetic operating process are provided for said second temporary storing means of said second processor, coefficients based on phase information are stored into the area to store the coefficients to perform said predetermined interpolation arithmetic operating process, and the image data of said plurality of lines transferred from said first processor and said coefficients are arithmetically operated and the interpolation arithmetic operating process is executed.

5. An apparatus according to claim 1, wherein a storing area of conversion ratio information based on a ratio of the number of scanning lines of the input image data and the number of scanning lines of output image data is provided for said second temporary storing means of said second processor, and said transfer request signal is generated in accordance with said conversion ratio information and said phase information.

6. An apparatus according to claim 5, wherein initial values of said phase information which are different in a first field and a second field are set into an image signal of an interlace system and an initial value of said phase information which is identical in the first and second fields is set into an image signal of a non-interlace system.

7. A scanning line number converting method comprising:
- a step of inputting 2-dimensional image data and arranging and storing said inputted 2-dimensional image data in correspondence to each pixel in a line direction;
- a first image processing step of inputting the image data arranged in correspondence to each pixel in said line direction, temporarily storing the image data of a plurality of lines, and performing an arithmetic operating process to said stored image data;
- a second image processing step of inputting the image data processed by said first image processing step, temporarily storing the image data of a plurality of lines, and performing an arithmetic operating process to said stored image data; and
- a step of transferring the image data processed by said second image processing step every line and arranging and storing said image data in correspondence to each pixel in the line direction,
- wherein said first and second image processing steps have a construction such that each column constructs element processors and a common command is given to each of said columns,
- said first image processing step is allowed to function as a first-in first-out register to temporarily store the image data of a plurality of lines, and
- in said second image processing step, a transfer request is generated and the image data is transferred from said first-in first-out register to temporarily store the image data of said plurality of lines in response to said transfer request, and a predetermined interpolation arithmetic operating process is performed, thereby performing a scanning line number conversion.

8. A method according to claim 7, wherein in said first image processing step, the image data of a plurality of lines is stored in a plurality of areas each for accumulating the image data of one line, write addresses and read addresses of said plurality of image data of one line are sequentially advanced, and said first image processing step is allowed to function as a first-in first-out register to temporarily store the image data of a plurality of lines.

9. A method according to claim 7, wherein in said first arithmetic operation processing step, the image processing arithmetic operation in a horizontal direction is performed.

10. A method according to claim 7, wherein in said second image processing step, the image data of said plurality of lines is accumulated, desired coefficients according to phase information are accumulated, said image data of a plurality of lines transferred and said desired coefficients are arithmetically operated, and said interpolation arithmetic operating process is performed.

11. A method according to claim 7, wherein in said second image processing step, conversion ratio information based on a ratio of the number of scanning lines of the input image data and the number of scanning lines of output image data is set, and said transfer request is generated on the basis of said conversion ratio information and said phase information.

12. A method according to claim 11, wherein initial values of said phase information which are different in a first field and a second field are set into an image signal of an interlace system and an initial value of said phase information which is identical in the first and second fields is set into an image signal of a non-interlace system.

* * * * *